US012651929B2

(12) United States Patent
Mishima et al.

(10) Patent No.: US 12,651,929 B2
(45) Date of Patent: Jun. 9, 2026

(54) DRIVE CONTROL APPARATUS FOR COMPOSITE RESONANCE CIRCUIT INCLUDING A PLURALITY OF RESONANCE CIRCUITS

(71) Applicant: OMRON Corporation, Kyoto (JP)

(72) Inventors: Taichi Mishima, Kyoto (JP); Yuki Ito, Kyoto (JP); Shingo Nagaoka, Kyoto (JP); Takeshi Uematsu, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 198 days.

(21) Appl. No.: 18/289,417

(22) PCT Filed: Mar. 29, 2022

(86) PCT No.: PCT/JP2022/015644
§ 371 (c)(1),
(2) Date: Nov. 3, 2023

(87) PCT Pub. No.: WO2022/239552
PCT Pub. Date: Nov. 17, 2022

(65) Prior Publication Data
US 2024/0380302 A1      Nov. 14, 2024

(30) Foreign Application Priority Data

May 12, 2021 (JP) .................................. 2021-081139

(51) Int. Cl.
*H02J 50/12* (2016.01)
*H02M 1/00* (2006.01)
(Continued)

(52) U.S. Cl.
CPC ........... *H02J 50/12* (2016.02); *H02M 1/0009* (2021.05); *H02M 1/0058* (2021.05);
(Continued)

(58) Field of Classification Search
CPC .. H02M 1/0009; H02M 1/0058; H02M 1/007; H02M 1/36; H02M 1/4208;
(Continued)

(56) References Cited

U.S. PATENT DOCUMENTS 9,660,536 B2 * 5/2017 Hosotani ............... H02M 3/338
9,806,534 B2 * 10/2017 Yamauchi ............... H02J 50/12
(Continued)

FOREIGN PATENT DOCUMENTS

JP      2015233359 A      12/2015
JP      6201388 B2      9/2017
(Continued)

OTHER PUBLICATIONS

International Search Report for International Application No. PCT/JP2022/015644; Date of Mailing, Jun. 7, 2022.
(Continued)

*Primary Examiner* — Yusef A Ahmed
(74) *Attorney, Agent, or Firm* — CANTOR COLBURN LLP

(57) ABSTRACT

A drive control apparatus is configured to drive and control a composite resonance circuit including LC resonant circuits including inductances L of power transmitting and receiving coils electromagnetically coupled to each other. The drive control apparatus includes: an inverter circuit configured to drive the composite resonance circuit by converting input DC power into AC power by switching the DC power at a predetermined operating frequency; an input current detector configured to detect an input current of the inverter circuit; and a frequency controller and driver configured to generate a drive signal of the inverter circuit while changing the operating frequency by using a predetermined extreme value search method to drive the inverter circuit, search for a resonance frequency of the composite resonance circuit (Continued)

based on the detected input current, and set the operating frequency based on the searched resonance frequency.

7 Claims, 25 Drawing Sheets

(51) Int. Cl.

| | | |
|---|---|---|
| *H02M 1/36* | (2007.01) |
| *H02M 1/42* | (2007.01) |
| *H02M 3/00* | (2006.01) |
| *H02J 50/80* | (2016.01) |
| *H02M 3/335* | (2006.01) |

(52) U.S. Cl.
CPC ............. *H02M 1/007* (2021.05); *H02M 1/36* (2013.01); *H02M 1/4208* (2013.01); *H02M 3/01* (2021.05); *H02J 50/80* (2016.02); *H02M 3/33592* (2013.01)

(58) Field of Classification Search
CPC ............... H02M 3/01; H02M 3/33592; H02M 3/33573; H02J 50/12; H02J 50/80; B60L 53/122; Y02T 10/70
See application file for complete search history.

(56) References Cited

U.S. PATENT DOCUMENTS

| | | | | |
|---|---|---|---|---|
| 9,987,935 | B2* | 6/2018 | Inoue | B60L 53/122 |
| 10,050,474 | B2* | 8/2018 | Ichikawa | H02J 50/80 |
| 12,136,826 | B2* | 11/2024 | Lee | H02M 3/01 |
| 2002/0179597 | A1* | 12/2002 | Kitaizumi | H05B 6/666 |
| | | | | 219/715 |
| 2006/0091821 | A1* | 5/2006 | Li | H05B 41/2822 |
| | | | | 315/209 R |
| 2012/0161696 | A1* | 6/2012 | Cook | B60L 3/04 |
| | | | | 320/108 |
| 2012/0223585 | A1* | 9/2012 | Urano | H02J 50/12 |
| | | | | 307/104 |
| 2012/0286726 | A1* | 11/2012 | Kim | H02J 50/005 |
| | | | | 320/108 |
| 2013/0082536 | A1* | 4/2013 | Taylor | H02J 50/12 |
| | | | | 307/104 |
| 2013/0300210 | A1* | 11/2013 | Hosotani | H01F 38/14 |
| | | | | 307/104 |
| 2014/0015340 | A1* | 1/2014 | Ito | H02J 50/20 |
| | | | | 307/104 |
| 2014/0035364 | A1* | 2/2014 | Uramoto | H01F 38/14 |
| | | | | 307/17 |
| 2014/0333150 | A1* | 11/2014 | Iwawaki | H02J 50/70 |
| | | | | 307/104 |
| 2015/0244176 | A1* | 8/2015 | Van Den Brink | H04B 5/266 |
| | | | | 307/104 |
| 2015/0280455 | A1* | 10/2015 | Bosshard | B60L 53/122 |
| | | | | 307/104 |
| 2015/0280790 | A1* | 10/2015 | Onizuka | H02J 50/10 |
| | | | | 320/108 |
| 2015/0326031 | A1* | 11/2015 | Yamaguchi | H02J 7/04 |
| | | | | 307/104 |
| 2015/0380944 | A1* | 12/2015 | Yu | H02J 50/12 |
| | | | | 307/104 |
| 2016/0013662 | A1* | 1/2016 | Wakabayashi | H02J 50/12 |
| | | | | 307/104 |
| 2016/0079951 | A1* | 3/2016 | Oosumi | H02J 5/00 |
| | | | | 307/104 |
| 2016/0126754 | A1* | 5/2016 | Ichikawa | H02J 50/05 |
| | | | | 307/104 |
| 2017/0012471 | A1* | 1/2017 | Misawa | H02M 1/42 |
| 2017/0018966 | A1* | 1/2017 | Misawa | H02M 7/53871 |
| 2017/0025898 | A1* | 1/2017 | Misawa | H02J 7/00712 |
| 2017/0025899 | A1* | 1/2017 | Misawa | H02M 3/3376 |
| 2017/0033586 | A1* | 2/2017 | Weidner | B60L 53/126 |
| 2017/0244282 | A1* | 8/2017 | Zhang | H02J 50/12 |
| 2017/0288462 | A1* | 10/2017 | Suzuki | H02J 50/12 |
| 2017/0324280 | A1* | 11/2017 | Suzuki | H02J 50/90 |
| 2019/0260234 | A1* | 8/2019 | Schumann | H02J 50/80 |
| 2019/0356168 | A1* | 11/2019 | Misawa | H02J 50/12 |
| 2019/0356169 | A1* | 11/2019 | Misawa | H02M 3/33573 |
| 2019/0366866 | A1* | 12/2019 | Cha | H02M 7/217 |
| 2019/0372395 | A1* | 12/2019 | Misawa | H02J 50/80 |
| 2020/0014245 | A1* | 1/2020 | Costinett | H02M 7/5387 |
| 2020/0083719 | A1* | 3/2020 | Suzuki | H02J 7/02 |
| 2021/0044151 | A1* | 2/2021 | Nakao | H02J 50/80 |
| 2021/0143676 | A1* | 5/2021 | Nakao | H02J 50/12 |
| 2021/0203187 | A1* | 7/2021 | Mishima | H02J 50/12 |
| 2022/0052554 | A1* | 2/2022 | Nagaoka | H02J 50/12 |
| 2022/0085649 | A1* | 3/2022 | Jiang | H02J 50/12 |
| 2022/0140637 | A1* | 5/2022 | Hosoi | H02J 50/402 |
| | | | | 307/104 |
| 2022/0337094 | A1* | 10/2022 | Wu | H02J 50/90 |
| 2023/0142869 | A1* | 5/2023 | Deng | H02M 1/007 |
| | | | | 320/108 |
| 2023/0275503 | A1* | 8/2023 | Mishima | H02M 1/007 |
| | | | | 363/13 |

FOREIGN PATENT DOCUMENTS

| | | |
|---|---|---|
| JP | 2019022266 A | 2/2019 |
| WO | 2012101907 A1 | 8/2012 |
| WO | 2013111307 A | 8/2013 |
| WO | 2014054157 A1 | 4/2014 |

OTHER PUBLICATIONS

PCT Written Opinion of the International Searching Authority for International Application No. PCT/JP2022/015644; Date of Mailing, Jun. 7, 2022.

* cited by examiner

<u>17</u>

INPUT CURRENT Iin

WITH NEGATIVE CURRENT

INPUT CURRENT Iin

WITH ALMOST NO NEGATIVE CURRENT

INPUT CURRENT Iin

WITH NEGATIVE CURRENT

WITH ALMOST NO NEGATIVE CURRENT

Fig. 19

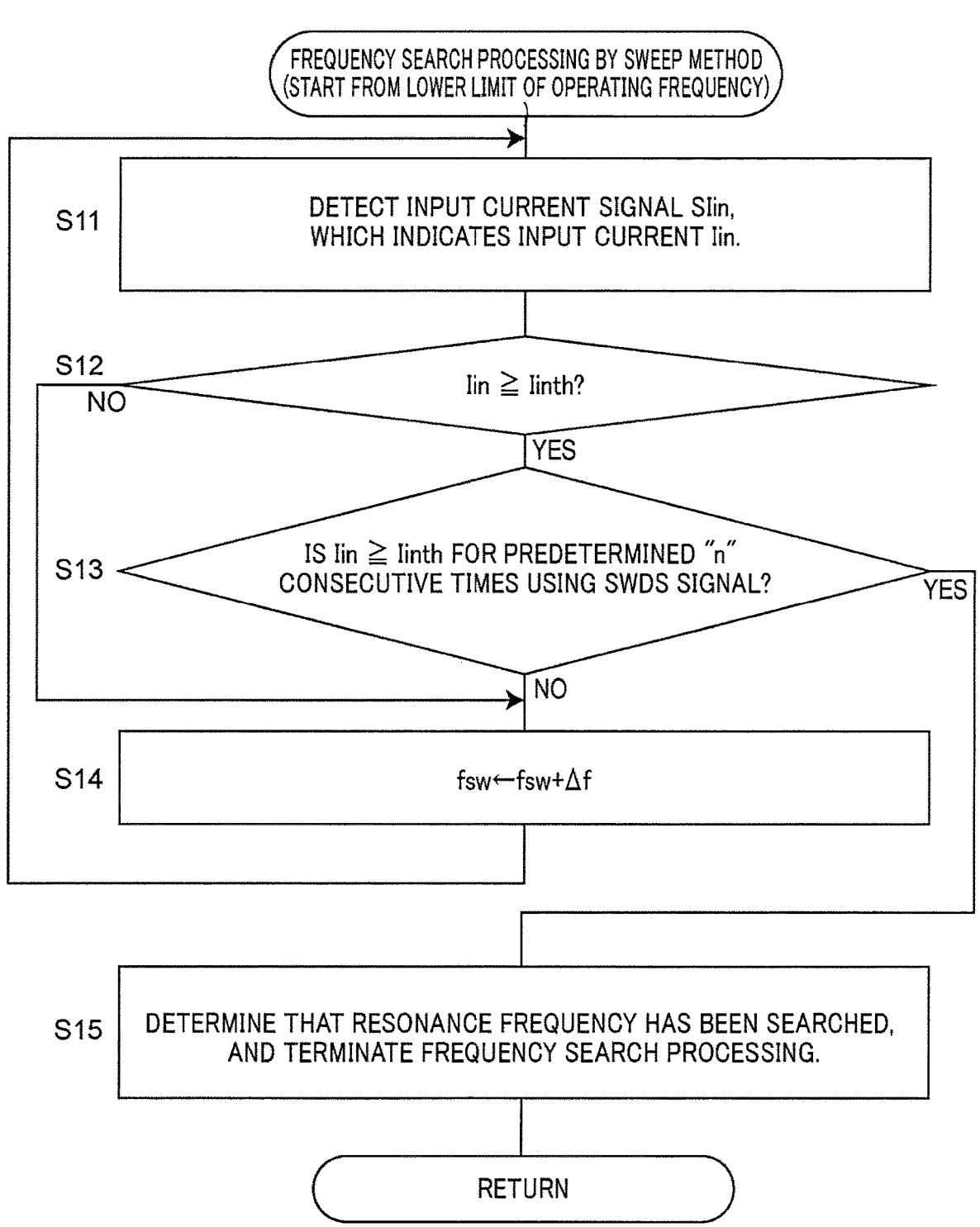

FREQUENCY SEARCH PROCESSING BY SWEEP METHOD
(START FROM LOWER LIMIT OF OPERATING FREQUENCY)

S11    DETECT INPUT CURRENT SIGNAL SIin, WHICH INDICATES INPUT CURRENT Iin.

S12    Iin ≧ Iinth?

NO

YES

S13    IS Iin ≧ Iinth FOR PREDETERMINED "n" CONSECUTIVE TIMES USING SWDS SIGNAL?

YES

NO

S14    fsw←fsw+Δf

S15    DETERMINE THAT RESONANCE FREQUENCY HAS BEEN SEARCHED, AND TERMINATE FREQUENCY SEARCH PROCESSING.

RETURN

B

S36    $fsw \leftarrow fsw - \Delta f$

S37    DETECT INPUT CURRENT SIGNAL SIin, WHICH INDICATES INPUT CURRENT Iin.

S38    Iin $\geq$ Iinth?    NO

YES

S39    IS Iin $\geq$ Iinth FOR PREDETERMINED "n" CONSECUTIVE TIMES USING SWDS SIGNAL?    NO

YES

S40    DETERMINE THAT RESONANCE FREQUENCY HAS BEEN SEARCHED, AND TERMINATE FREQUENCY SEARCH PROCESSING.

RETURN

Fig. 24E
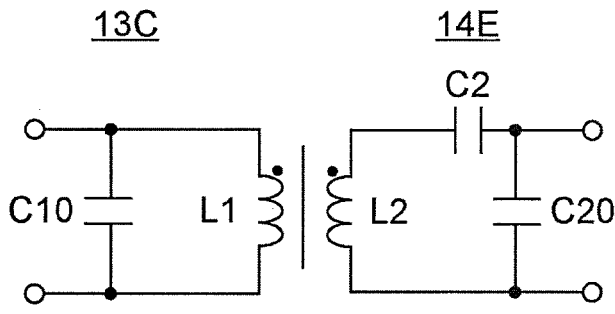
Fig. 24F
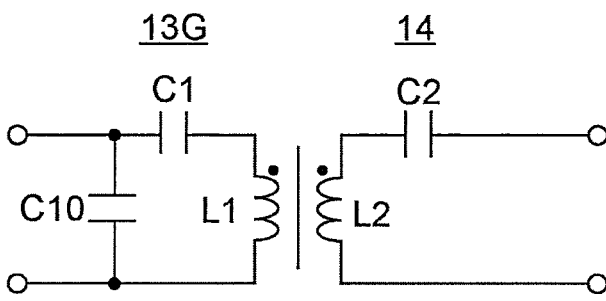
Fig. 24G
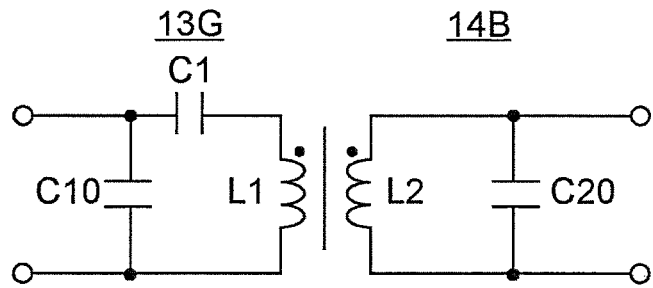
Fig. 24H

DRIVE CONTROL APPARATUS FOR COMPOSITE RESONANCE CIRCUIT INCLUDING A PLURALITY OF RESONANCE CIRCUITS

CROSS REFERENCE TO RELATED APPLICATIONS

This is the U.S. national stage of application No. PCT/JP2022/015644, filed on Mar. 29, 2022. Priority under 35 U.S.C. § 119 (a) and 35 U.S.C. § 365 (b) is claimed from Japanese Application No. 2021-081139, filed May 12, 2021, the disclosure of which is also incorporated herein by reference.

TECHNICAL FIELD

The present invention relates to a drive control apparatus for a composite resonance circuit, where the drive control apparatus is configured to drive and control a composite resonance circuit including a plurality of resonance circuits and relates a non-contact power supply system using the drive control apparatus for the composite resonance circuit.

BACKGROUND ART

Conventionally, for example, a moving body such as a wireless conveyance vehicle (Automatic Guided Vehicle (AGV)) is mounted with a rechargeable battery such as a lithium ion battery. When the rechargeable battery is charged, after AGV is moved to a charging station, a power receiving coil mounted on AGV is electromagnetically coupled to a power transmitting coil of a charging station to perform non-contact charging in a non-contact charging system.

The non-contact power supply system using the non-contact power transfer has been widely studied in order to improve convenience and safety. In an application to be used, a positional relationship between power transmitting and receiving coils may fluctuate, and a change in magnetic characteristics due to this is one of hindrance factors of keeping power conversion (supply) efficiency high. In this case, since the resonance frequency changes due to a change in a coupling degree "k" and an inductance "L" due to a fluctuation in the positional relationship between the power transmitting and receiving coils, the power conversion efficiency of the circuit deteriorates due to a decrease in the transmission efficiency and the power factor. Therefore, it is necessary to control the operating frequency to be optimized according to the fluctuation in the positional relationship between the power transmitting and receiving coils.

Then, for example, in the non-contact power supply system according to Patent Document 1, a method using information on a power receiving apparatus is used to determine an optimum operating frequency.

PRIOR ART DOCUMENT

Patent Document

Patent Document 1: Japanese patent No. JP6201388B2

SUMMARY OF THE INVENTION

Problems to be Solved by the Invention

However, in the method using the information on the power receiving apparatus to determine the optimum operating frequency, there is such a problem that communication between power transmission and reception is required, and it takes time by the communication time.

An object of the present invention is to solve the above problem, and to provide a drive control apparatus for a composite resonance circuit, and a non-contact power supply system using the drive control apparatus for the composite resonance circuit, which are capable of controlling an operating frequency to be optimized in a shorter time than that of the related art using information only on a power transmission apparatus.

According to one aspect of the present invention, there is provided a drive control apparatus for a composite resonance circuit, the drive control apparatus is configured to drive and control the composite resonance circuit including a plurality of LC resonant circuits including inductances L of power transmitting and receiving coils electromagnetically coupled to each other. The drive control apparatus includes an inverter circuit, an input current detector, and a frequency controller and deriver. The inverter circuit is configured to drive the composite resonance circuit by converting input DC power into AC power by switching the DC power at a predetermined operating frequency. The input current detector is configured to detect an input current of the inverter circuit. The frequency controller and driver is configured to generate a drive signal of the inverter circuit while changing the operating frequency by using a predetermined extreme value search method to drive the inverter circuit, search for a resonance frequency of the composite resonance circuit based on the detected input current, and set the operating frequency based on the searched resonance frequency.

Effects of the Invention

Therefore, according to the drive control apparatus for the composite resonance circuit according to the present invention, it is possible to control the operating frequency to be optimized in a shorter time than that of the related art using the information only on the power transmission apparatus.

BRIEF DESCRIPTION OF THE DRAWINGS

FIG. 19 is a flowchart illustrating frequency search processing by the sweep method (in a case of starting from a lower limit of an operating frequency) executed by the frequency controller and driver 17 in FIG. 2.

FIG. 24E is a circuit diagram illustrating a configuration example of a composite resonance circuit according to a fourth modified embodiment.

FIG. 24F is a circuit diagram illustrating a configuration example of a composite resonance circuit according to a fifth modified embodiment.

FIG. 24G is a circuit diagram illustrating a configuration example of a composite resonance circuit according to a sixth modified embodiment.

FIG. 24H is a circuit diagram illustrating a configuration example of a composite resonance circuit according to a seventh modified embodiment.

DETAILED DESCRIPTION

Figure 1:
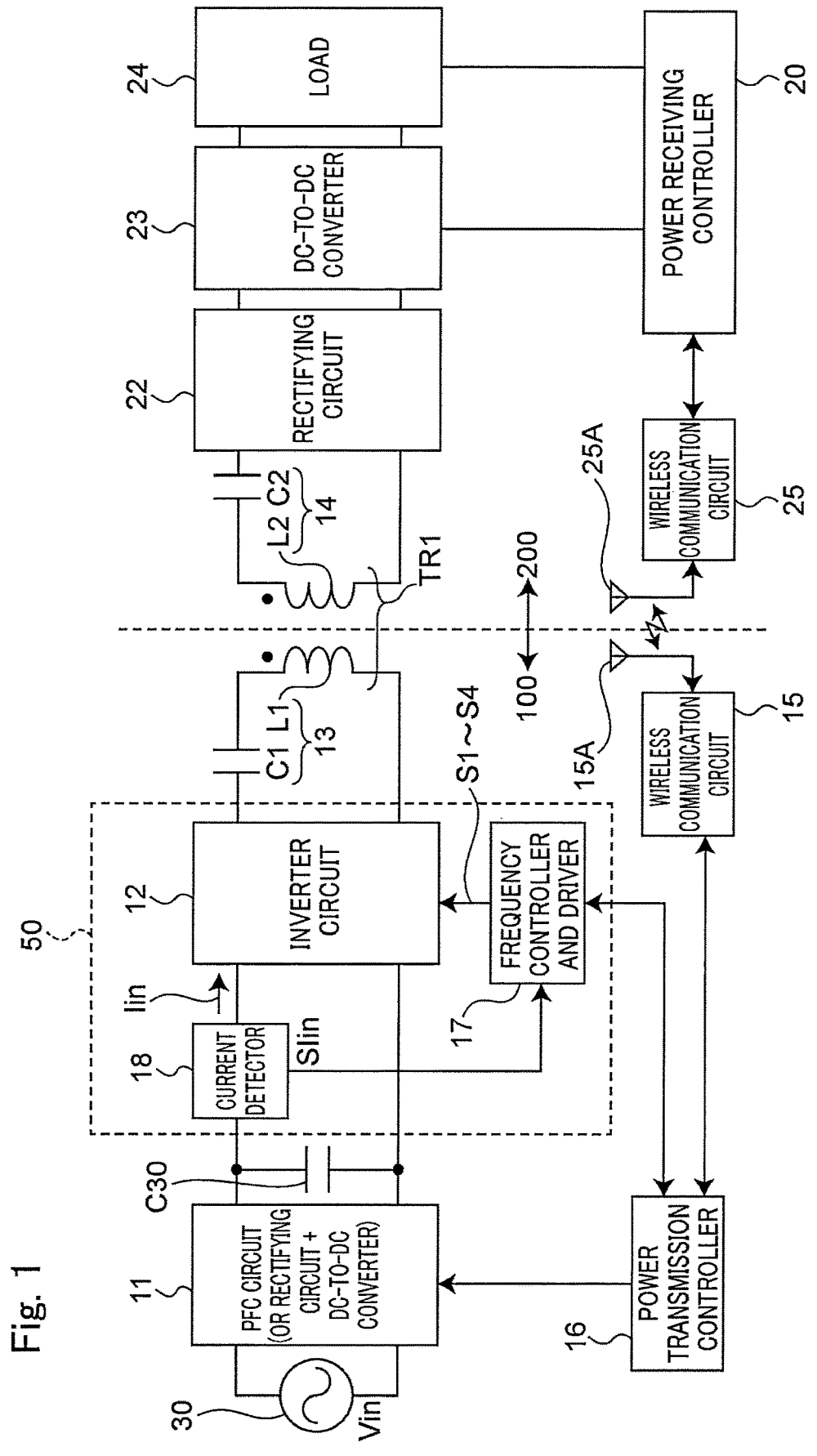
FIG. 1 is a block diagram illustrating a configuration example of a non-contact power supply system according to an embodiment.

Hereinafter, embodiments and modified embodiments according to the present invention will be described with reference to the drawings. It is noted that the same or similar components are denoted by the same reference numerals.

Findings of Inventors

Figure 3:
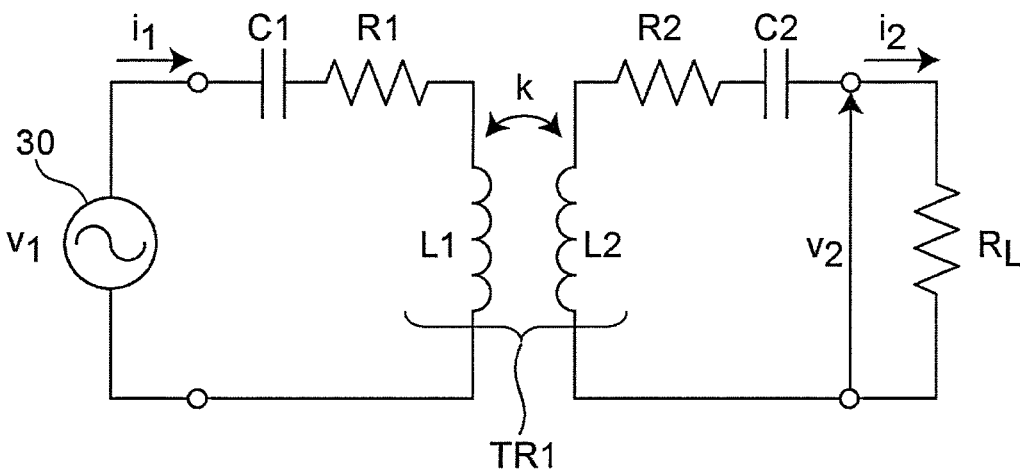
FIG. 3 is a circuit diagram illustrating a basic circuit of the non-contact power supply system.

FIG. 3 is a circuit diagram illustrating a basic circuit of a non-contact power supply system. Referring to FIG. 3, an AC power supply 30 on a power transmission apparatus is connected to a resistor RL via a power transmission side RLC resonance circuit that is a series circuit of a resistor R1, an inductor L1, and a capacitor C1, and a power receiving RLC resonance circuit that is a series circuit of a resistor R2, an inductor L2, and a capacitor C2. In this case, the inductor L1 and the inductor L2 are electromagnetically coupled with a coupling degree "k" to configure a transformer TR1. In the non-contact power supply system configured as described above, AC power from the AC power supply 30 is transmitted to the resistor RL via the power transmission RLC resonance circuit and the power receiving RLC resonance circuit.

Figure 4:
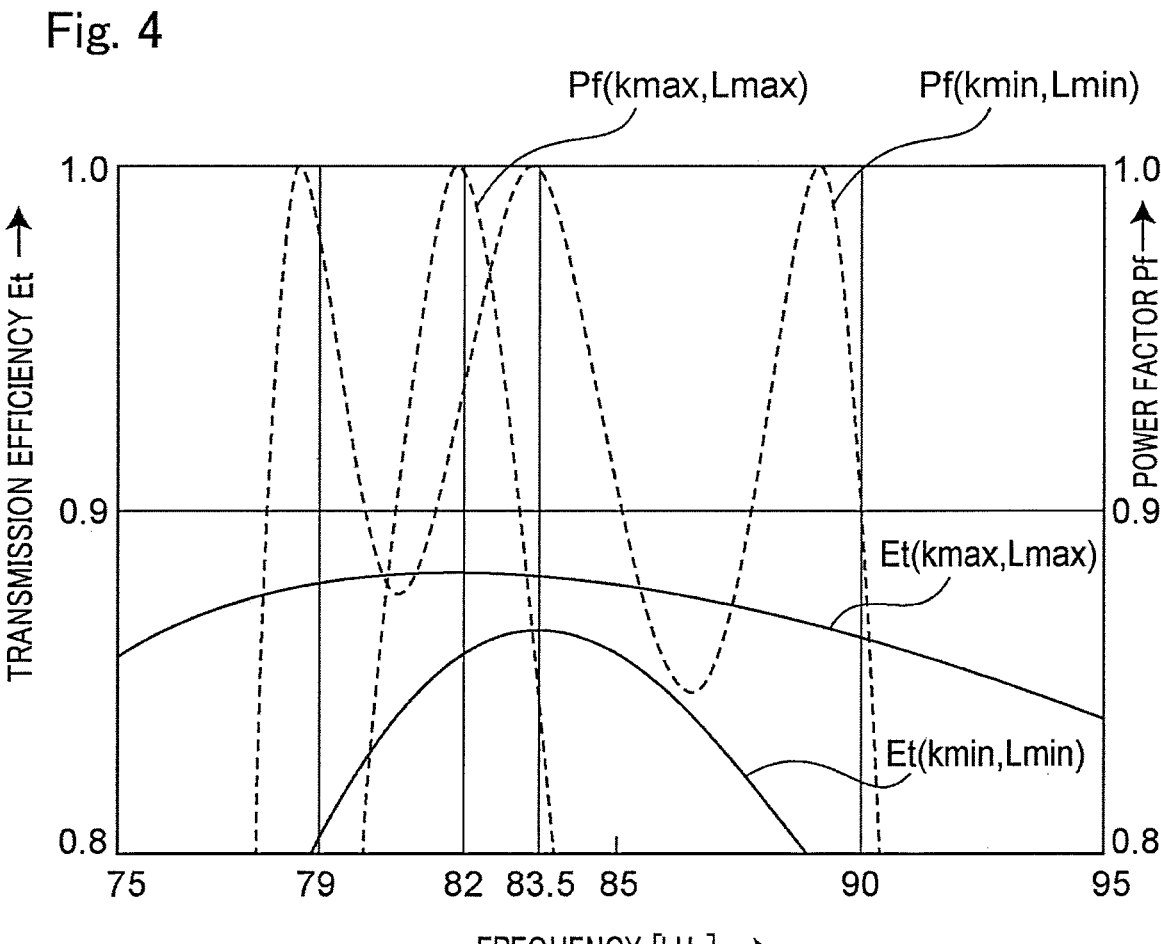
FIG. 4 is a graph illustrating an example of frequency characteristics of transmission efficiency and an input power factor in the non-contact power supply system in FIG. 3.

FIG. 4 is a graph illustrating an example of frequency characteristics of transmission efficiency and an input power factor in the non-contact power supply system in FIG. 3. As is apparent from FIG. 4, since the resonance frequency changes due to a fluctuation in the coupling degree "k" and the inductance "L" due to a change in the positional relationship between the power transmitting and receiving coils (between the inductors L1 and L2), the power conversion efficiency of the circuit deteriorates due to a decrease in the transmission efficiency or the input power factor. Therefore, it is necessary to control the operating frequency (switching frequency of the inverter circuit) to be optimum according to the fluctuation in the positional relationship between the power transmitting and receiving coils. In order to solve this problem, the following non-contact power supply system has been devised.

Embodiment

FIG. 1 is a block diagram illustrating a configuration example of a non-contact power supply system according to an embodiment.

In the non-contact power supply system in FIG. 1, a drive control apparatus for a composite resonance circuit that performs frequency search for optimizing an operating frequency (switching frequency) of an inverter circuit 12 every time the positional relationship between power transmission coils (between inductors L1 and L2) is changed by detecting an input current Iin of a power transmission apparatus 100 to maximize power conversion efficiency. In this case, the optimum operating frequency is an operating frequency at which transmission efficiency and an input power factor are maximum and at which a zero-volt switching (ZVS) operation is performed. Accordingly, the present embodiment has the following specific effects.

(1) DC-to-DC converter 23 of a power receiving apparatus 200 for maximizing the transmission efficiency can be eliminated. Referring to FIG. 1, DC-to-DC converter 23 is inserted for modified embodiment but may be deleted in the present embodiment as described later in detail.

(2) In order to maximize the efficiency in the power transmission apparatus 100, it is unnecessary to perform impedance matching by DC-to-DC converter 23 in the power receiving apparatus 200.

For example, in AGV system, after AGV is moved to the charging station, the power receiving coil mounted on AGV is electromagnetically coupled to the power transmitting coil of the charging station to perform non-contact charging in the non-contact charging system, and before the charging, optimization processing of the operating frequency including frequency search according to the present embodiment is executed.

Figure 5:
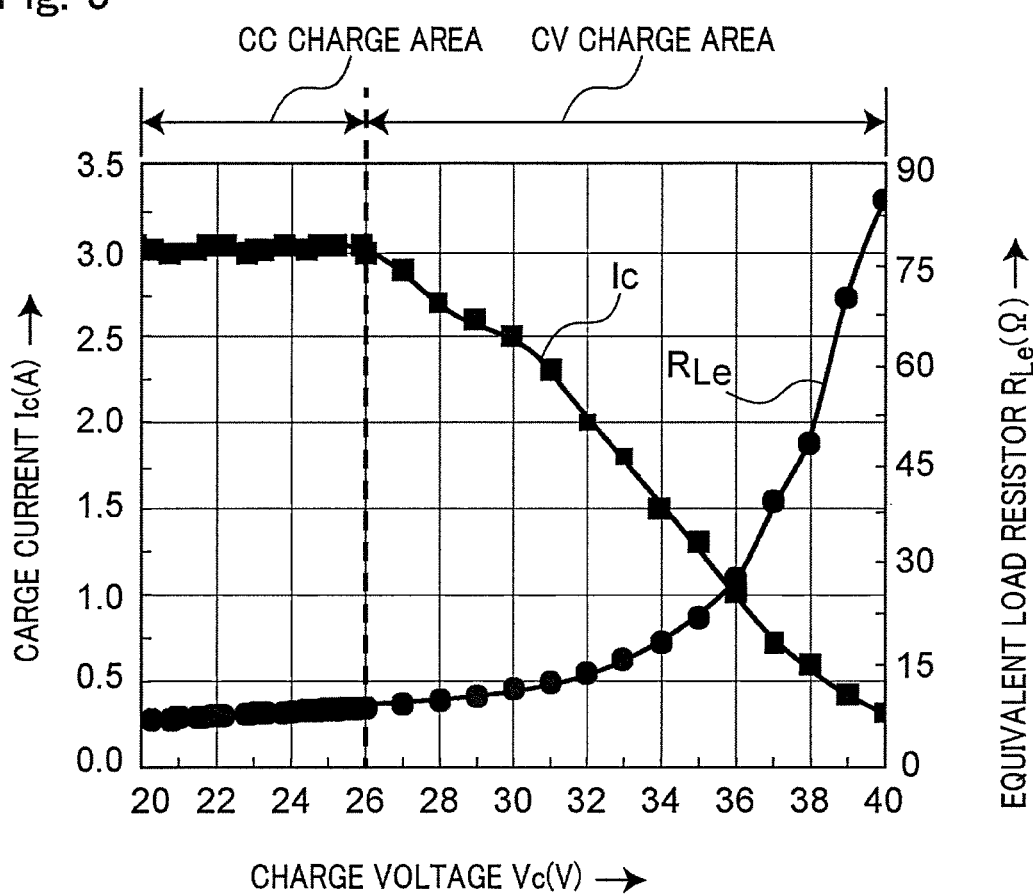
FIG. 5 is a graph illustrating characteristics of a charging current and an equivalent load resistance with respect to a charging voltage when a load is a rechargeable battery.
Figure 6:
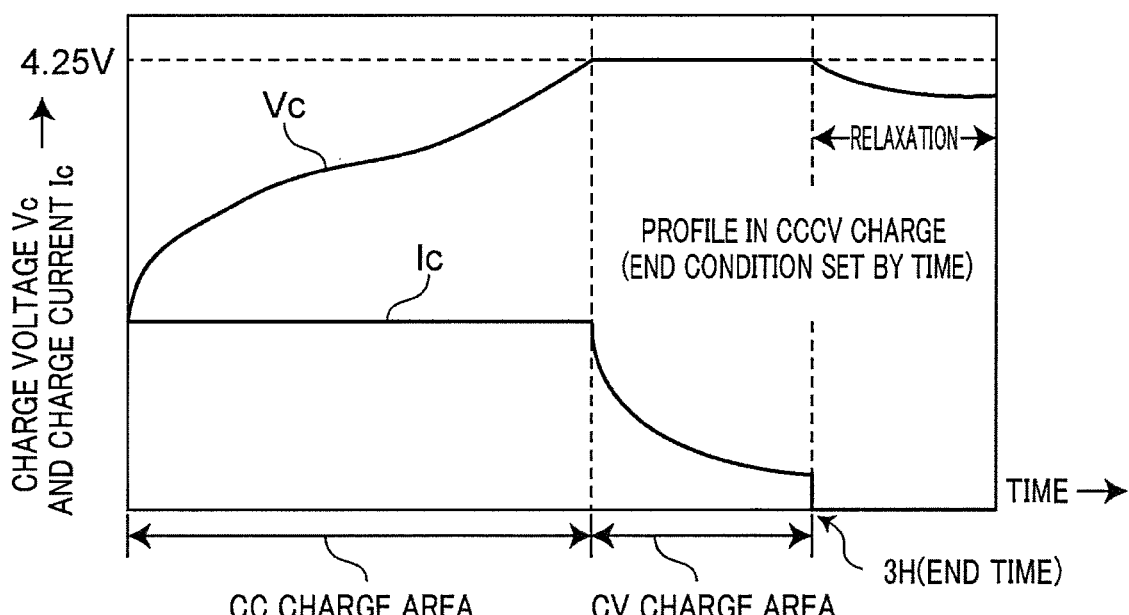
FIG. 6 is a graph illustrating an example of a charging profile when the rechargeable battery is charged.
Figure 7:
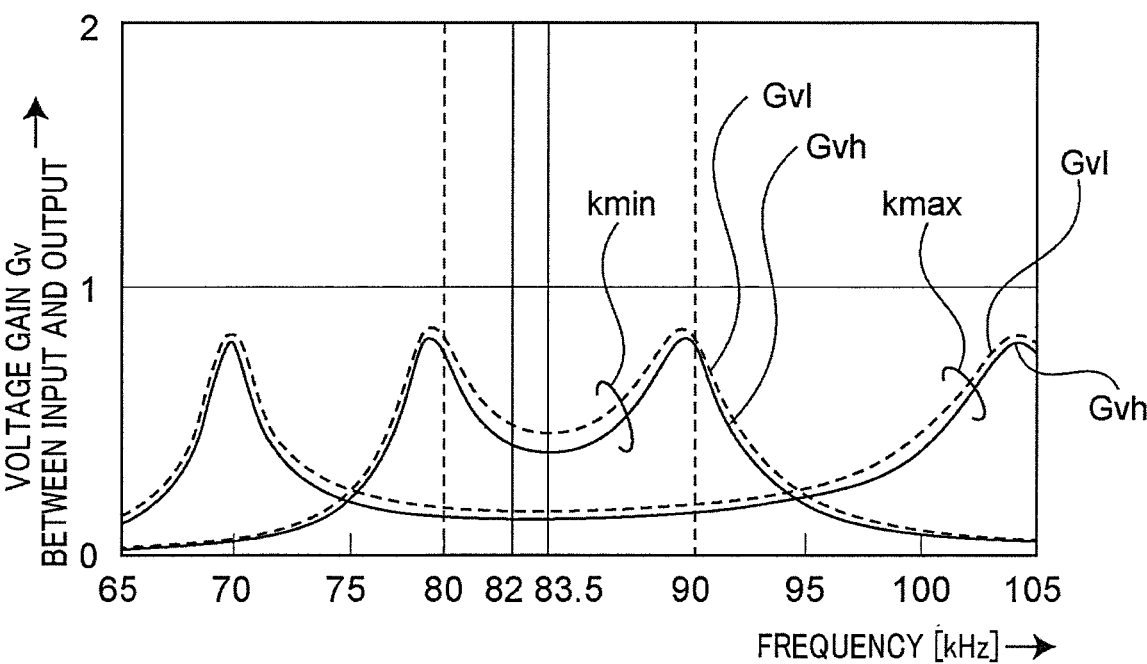
FIG. 7 is a graph illustrating frequency characteristics of a gain between input and output of a resonance tank used in the non-contact power supply system.

FIG. 5 is a graph illustrating characteristics of a charging current and an equivalent load resistance with respect to a charging voltage when a load is a rechargeable battery, and FIG. 6 is a graph illustrating an example of a charging profile when a rechargeable battery is charged. Further, FIG. 7 is a graph illustrating frequency characteristics of a gain between input and output of a resonance tank used in the non-contact power supply system. It is noted that, in FIG. 6, a CC charging region is a constant current charging region, and a CV charging region is a constant voltage charging region.

As is apparent from FIG. 5, a load RL fluctuates depending on the remaining amount of the rechargeable battery. As a result, as illustrated in FIG. 7, the output voltage and the output current, which are output characteristics of the circuit, fluctuate. Therefore, for example, as illustrated in FIG. 6, control for satisfying the charging profile of the rechargeable battery is required.

Figure 8:
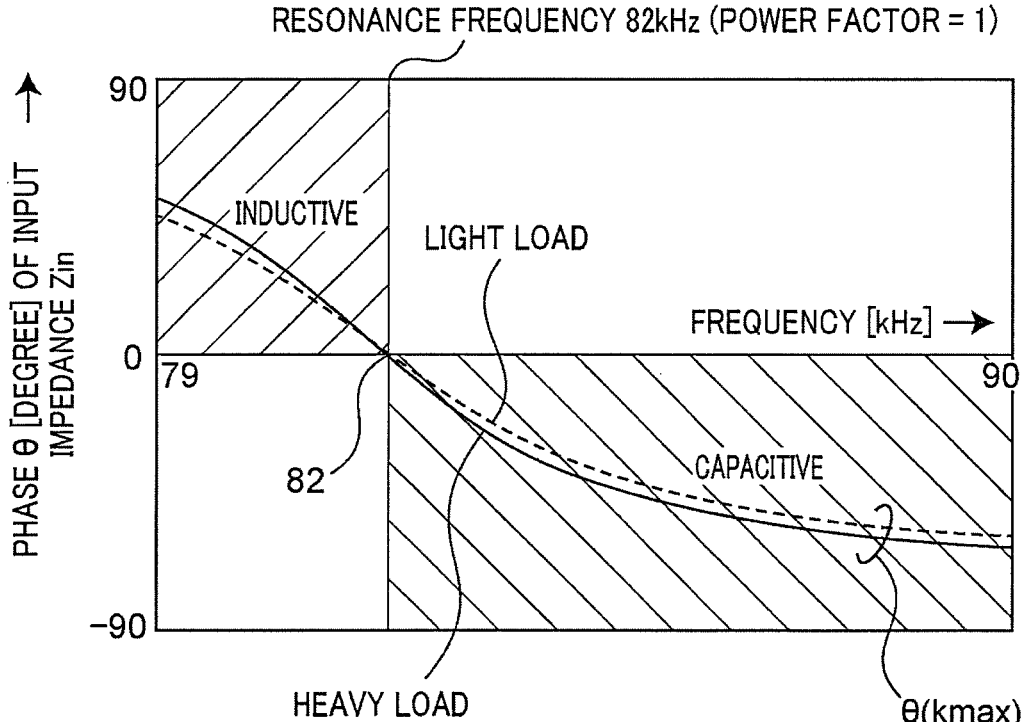
FIG. 8 is a graph illustrating frequency characteristics of a phase $\theta$ of an input impedance Zin for explaining a method of frequency search by the frequency controller and driver 17 in FIG. 1.
Figure 9A:
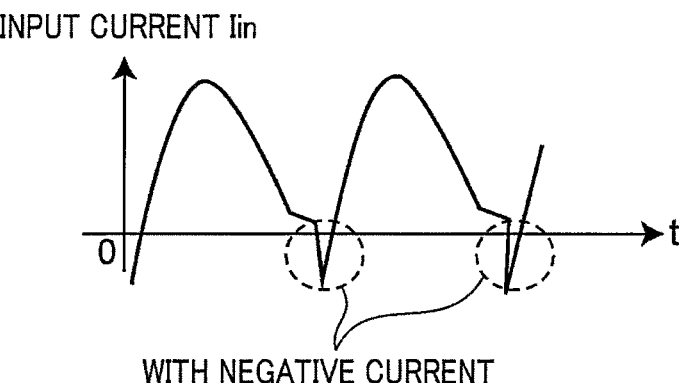
FIG. 9A is a diagram illustrating an input current waveform in an Inductive (L) region in FIG. 8.
Figure 9B:
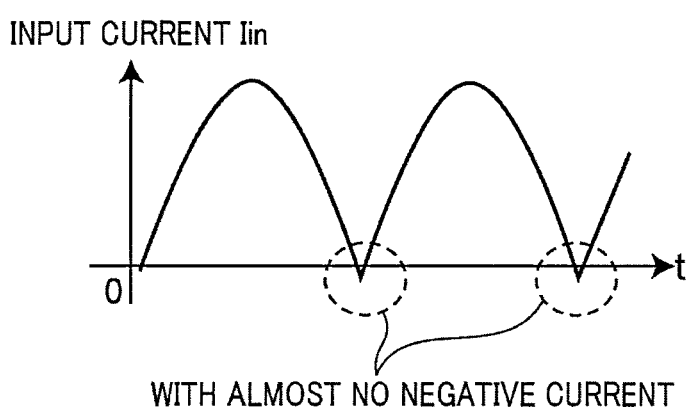
FIG. 9B is a diagram illustrating an input current waveform at a resonance frequency in FIG. 8.

FIG. 8 is a graph illustrating frequency characteristics of a phase θ of an input impedance Zin for explaining a method of frequency search by a frequency controller and driver 17 in FIG. 1. Further, FIG. 9A is a diagram illustrating an input current waveform in an Inductive (L) region in FIG. 8, FIG. 9B is a diagram illustrating an input current waveform at the resonance frequency in FIG. 8, and FIG. 9C is a diagram illustrating an input current waveform in a Capacitive (C) region in FIG. 8.

Figure 9C:
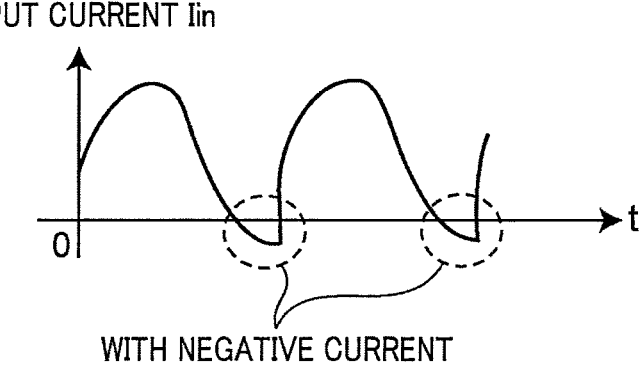
FIG. 9C is a diagram illustrating an input current waveform in a Capacitive (C) region in FIG. 8.

In the present embodiment, as illustrated in FIGS. 8 to 9C, the operating frequency is set to an optimum resonance frequency by determining whether the input current is a negative current or a value close to the negative current and performing frequency search using the fact that the negative current hardly flows at the resonance frequency where the input power factor is 1 within the range of the operating frequency of the inverter circuit 12. It is noted that, in order to cause the inverter circuit 12 to perform a zero-volt switching (ZVS) operation, it is preferable to set and operate the inverter circuit 12 by moving the operating frequency of the inverter circuit 12 to a low frequency side of about 1 kHz from the resonance frequency of the composite resonance circuit subjected to the frequency search.

The non-contact power supply system in FIG. 1 includes the power transmission apparatus 100 and the power receiving apparatus 200. In this case, the power transmission apparatus 100 includes a power factor correction circuit (hereinafter, referred to as PFC circuit) 11, a capacitor C30, a power transmission controller 16 including PFC control unit that controls the operation of PFC circuit 11, a current detector 18, a frequency controller and driver 17, a power transmission LC resonance circuit 13, and a wireless communication circuit 15 having an antenna 15A.

In this case, the current detector 18, the inverter circuit 12, and the frequency controller and driver 17 configure a drive control apparatus 50 for a composite resonance circuit, that drives and controls the composite resonance circuit including the power transmission LC resonance circuit 13 and the power receiving LC resonance circuit 14. In this case, as will be described later with reference to FIG. 16, the composite resonance circuit preferably has a resonance frequency at which the phase difference between the current flowing through the power transmission LC resonance circuit 13 and the voltage applied to the power transmission LC resonance circuit 13 is 0 and the power factor is 1 within the operating frequency range of the inverter circuit 12.

On the other hand, the power receiving apparatus 200 includes a power receiving LC resonance circuit 14, a rectifying circuit 22, a DC-to-DC converter 23, a load 24, a power receiving control unit 20 that detects a voltage and a current of the load 24 and controls DC-to-DC converter 23, and a wireless communication circuit 25 having an antenna 25A.

In this case, the power transmission apparatus 100 and the power receiving apparatus 200 are located close to each other for power supply such as charging, for example. Accordingly, the power transmission LC resonance circuit 13 and the power receiving LC resonance circuit 14 are electromagnetically coupled to each other, for example, to configure a transformer TR1. In addition, the wireless communication circuit 15 and the wireless communication circuit 25 transmit and receive necessary information data by performing wireless communication using the antennas 15A and 25A, respectively. It is noted that, as described later in detail, PFC circuit 11 may be a cascade connection circuit of a rectifying circuit and a DC-to-DC converter. DC-to-DC converter converts an input DC voltage into a predetermined DC voltage. In the present embodiment, the power receiving control unit 20 performs charge completion determination and transmits the information to the power transmission controller 16 via the wireless communication circuits 25 and 15.

In the power transmission apparatus 100 in FIG. 1, PFC circuit 11 converts the input voltage Vin, which is an AC voltage from the AC power supply 30 such as a commercial AC power supply, into a DC voltage, and performs power factor correction processing on the input voltage using a predetermined power factor correction method under the control of PFC control unit in the power transmission controller 16, and then, outputs the output voltage to the inverter circuit 12 via the capacitor C30 and the current detector 18. The current detector 18 detects the input current Iin and outputs an input current signal SIin having a level corresponding to (for example, proportional to) the input current Iin to the frequency controller and driver 17. After frequency search processing of setting the resonance frequency based on the input current signal SIin and the operating frequency is executed in pre-processing by the frequency controller and driver 17, the inverter circuit 12 converts the input DC voltage into a predetermined AC voltage by switching the input DC voltage based on the frequency control and the PWM gate signal from the drive unit 17, for example, and outputs the AC voltage to the rectifying circuit 22 via the power transmission LC resonance circuit 13 and the power receiving LC resonance circuit 14.

In this case, PFC control unit of the power transmission controller 16 receives load information such as an output voltage and an output current to the load 24 from the power receiving control unit 20 via the wireless communication circuits 25 and 15, and controls PFC circuit 11 to perform the power factor correction processing based on the load information. The power transmission LC resonance circuit 13 is an LC resonance circuit including the inductor L1 and the capacitor C1 illustrated in FIG. 24A, for example, generates AC power resonated at a predetermined resonance frequency fr based on the input voltage and including an AC voltage having a resonance frequency fr, and transmits the generated AC power to the power receiving LC resonance circuit 14 coupled to the power transmission LC resonance circuit 13.

Figure 24A:
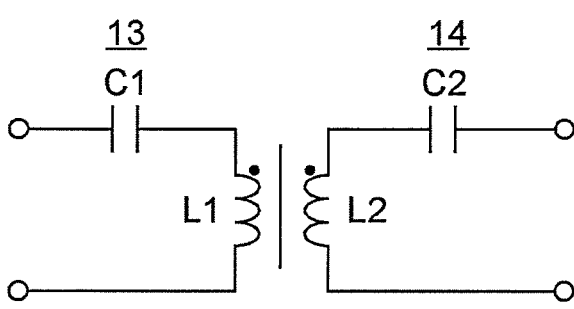
FIG. 24A is a circuit diagram illustrating a configuration example of a composite resonance circuit according to the embodiment.

In the power receiving apparatus 200 in FIG. 1, the power receiving LC resonance circuit 14 is, for example, an LC resonance circuit illustrated in FIG. 24A, which includes the inductor L2 and the capacitor C2, receives the AC power from the power transmission LC resonance circuit 13, and outputs the AC voltage of the AC power to the rectifying circuit 22. The rectifying circuit 22 rectifies the input AC voltage into a DC voltage, and outputs the DC voltage to the load 24. The power receiving control unit 20 detects the output voltage and the output current to the load 24 and transmits information including the information and the charge completion determination information to the power transmission controller 16 via the wireless communication circuits 25 and 15.

It is noted that, as will be described in detail later, the rectifying circuit 22 may be, for example, a rectifying circuit such as a half-wave rectifying circuit, a dual-wave rectifying circuit, a full-bridge rectifying circuit, a half-active rectifying circuit, a voltage doubler rectifying circuit, or a current doubler rectifying circuit. Further, the rectifying circuit 22 may rectify the input AC power into DC power.

Figure 2:
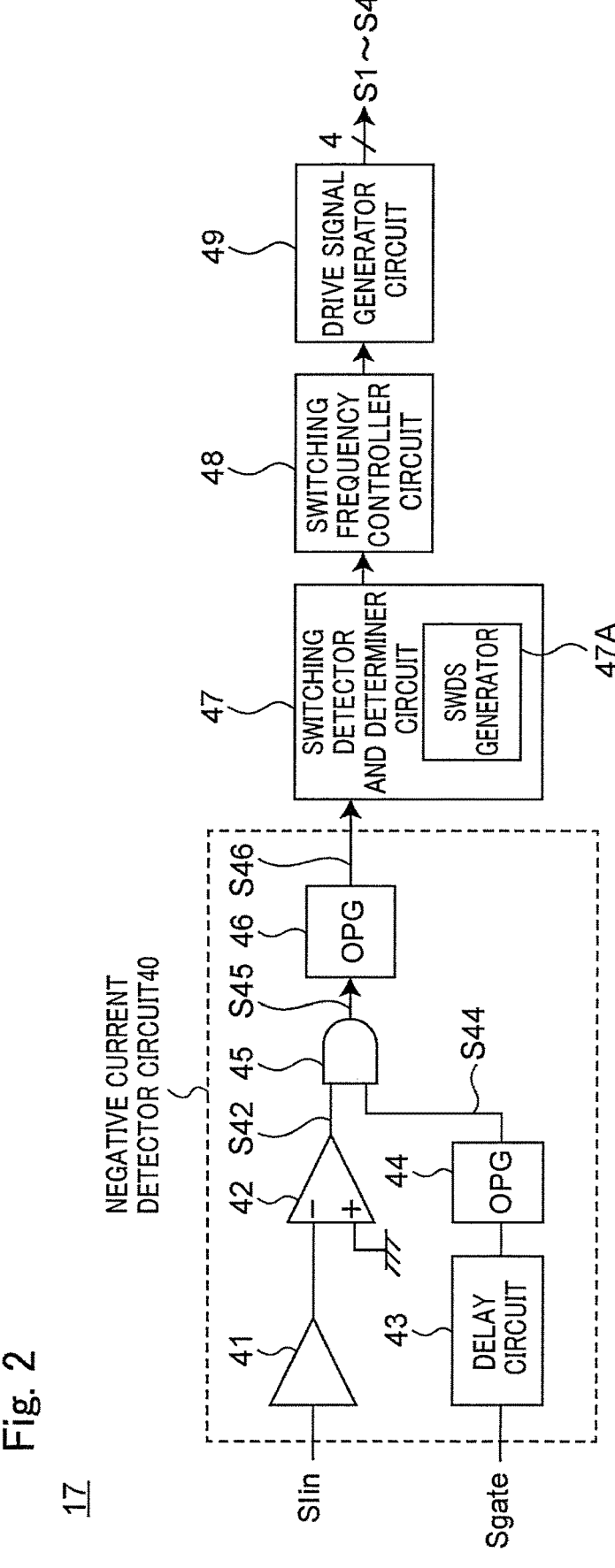
FIG. 2 is a block diagram illustrating a detailed configuration example of a frequency controller and driver 17 in FIG. 1.

FIG. 2 is a block diagram illustrating a detailed configuration example of the frequency controller and driver 17 in FIG. 1.

Referring to FIG. 2, the frequency controller and driver 17 includes a negative current detector circuit 40, a switching detector and determiner circuit 47, a switching frequency controller circuit 48, and a drive signal generator circuit 49. In this case, the negative current detector circuit 40 includes a signal amplifier 41, a comparator 42, a delay circuit 43, a one-shot pulse generator (hereinafter, referred to as OPG) 44, AND gate 45, and OPG 46. In addition, the switching detector and determiner circuit 47 includes SWDS generator 47A that generates SWDS signal that is a switching detection signal having a predetermined pulse width.

The input current signal SIin from the current detector 18 is input to the inverting input terminal of the comparator 42 via the signal amplifier 41. A zero voltage is input to the inverting input terminal of the comparator 42. The comparator 42 compares the input current signal SIin with a zero voltage to generate a detection signal S42 indicating whether or not a negative current is generated, and outputs the detection signal S42 to AND gate 45. In this case, the detection signal S42 becomes a high level when a negative current is generated, whereas it becomes a low level when no negative current is generated. A gate signal Sgate having a predetermined width from the power transmission controller 16 is input to OPG 44 via the delay circuit 43 that is delayed by a time corresponding to the delay time by the other circuit in order to match the negative current detection timing in AND gate 45. In response to the rise of the input signal, OPG 44 generates a gate width signal S44 that is a pulse having a predetermined width and outputs the gate width signal S44 to AND gate 45. AND gate 45 calculates the logical product of the two input signals, and outputs the calculated detection signal S45 to OPG 46. In response to the rise of the input detection signal S45, OPG 46 generates a detection signal S46 that is a pulse having a predetermined width and outputs the detection signal S46 to the switching detector and determiner circuit 47.

When the input detection signal S46 and SWDS signal are at the low level, based on both the signals, the switching detector and determiner circuit 47 determines that the operating frequency of the inverter circuit 12 is set to the resonance frequency and outputs the determination signal to the switching frequency controller circuit 48. The switching frequency controller circuit 48 executes frequency search processing described later and outputs a signal indicating a switching frequency to be set to the drive signal generator circuit 49. In response to this, the drive signal generator circuit 49 generates the gate control signals S1 to S4 having the designated operating frequency and applies the gate control signals S1 to S4 to a gate of a MOS transistor of the inverter circuit 12.

Figure 10:
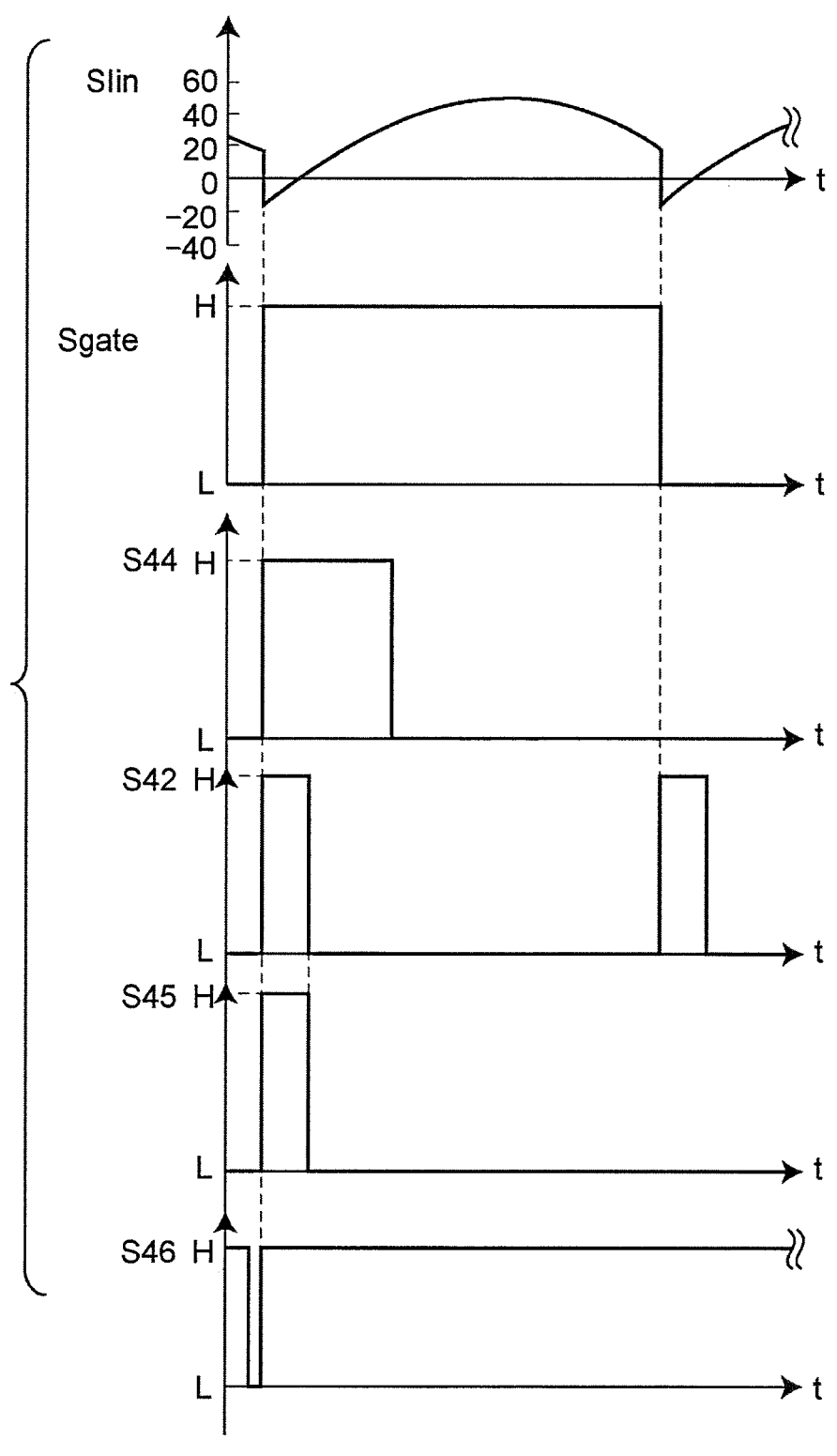
FIG. 10 is a timing chart of each signal illustrating an operation of the frequency controller and driver 17 in FIG. 1.

FIG. 10 is a timing chart of each signal illustrating an example of an operation of the frequency controller and driver 17 in FIG. 1. As is apparent from FIG. 10, the frequency controller and driver 17 can generate the detection signals S42, S44, S45, and S46 based on the input current signal SIin and the gate signal Sgate.

Figure 11:
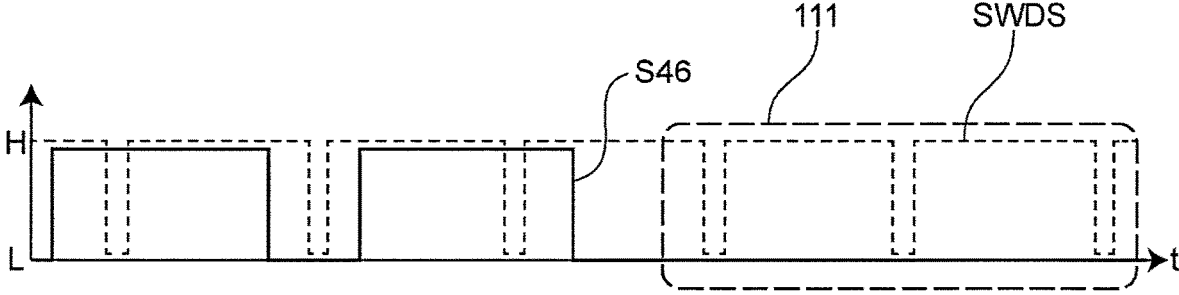
FIG. 11 is a timing chart illustrating an operation in which an switching detector and determiner circuit in FIG. 2 detects switching of the frequency by comparing a detection signal S46 with a switching detection signal SWDS.

FIG. 11 is a timing chart illustrating an operation in which the switching detector and determiner circuit in FIG. 2 detects the switching of the frequency by comparing the detection signal S46 with SWDS signal. It is noted that, in the timing charts in FIGS. 11 to 15, for convenience of illustration, the level of SWDS signal is slightly shifted upward in order to clarify the difference between each of the detection signals S45 and S46 and SWDS signal.

The switching frequency controller circuit 48 controls the operating frequency of the inverter circuit 12 to increase or decrease until it is determined as the resonance frequency. On the other hand, as indicated by 111 in FIG. 11, the switching detector and determiner circuit 47 in the preceding stage determines that the frequency is the resonance frequency when both the detection signal S46 and SWDS signal become the low level. In this case, in order to prevent erroneous detection, for example, the power transmission controller 16 may be configured to count a predetermined number of pulses of both the signals.

Next, the pulse width (high-level interval) of the detection signal S46 output from OPG 46 will be described below.

Figure 12:
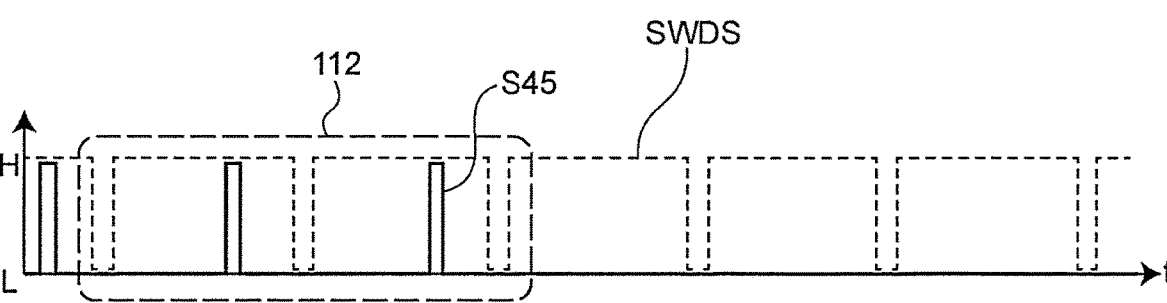
FIG. 12 is a timing chart illustrating a temporal relationship between a detection signal S45 and the switching detection signal SWDS for explaining setting of a high-level interval of the detection signal S46 generated by a one-shot pulse generator (OPG) 46 in FIG. 2.

FIG. 12 is a timing chart illustrating a temporal relationship between the detection signal S45 and SWDS signal for explaining setting of a pulse width (high-level interval) of the detection signal S46 generated by OPG 46 in FIG. 2. Furthermore, FIG. 13 is a timing chart illustrating a temporal relationship between the detection signal S46 and SWDS signal for explaining setting of a high-level interval of the detection signal S46 generated by OPG 46 in FIG. 2.

Figure 13:
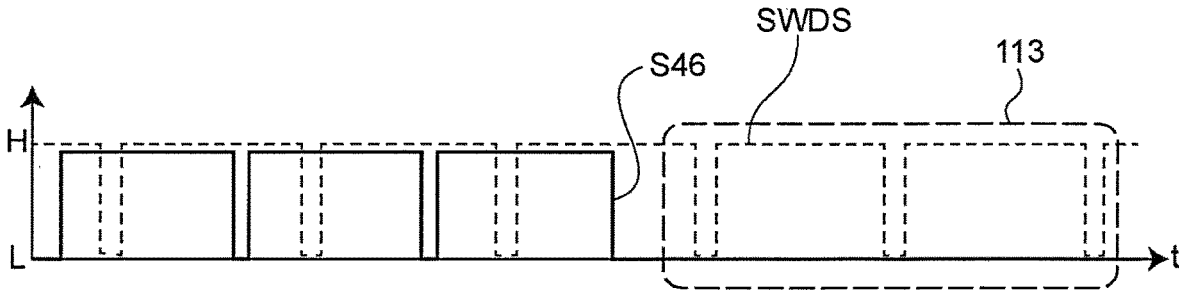
FIG. 13 is a timing chart illustrating a temporal relationship between the detection signal S46 and the switching detection signal SWDS for explaining setting of the high-level interval of the detection signal S46 generated by the one-shot pulse generator (OPG) 46 in FIG. 2.

As is apparent from 112 in FIG. 12, since the pulse width of the detection signal S45 output from AND gate 45 is generally short, OPG 46 is provided at the subsequent stage to prevent erroneous detection of the resonance frequency including a case where the detection timing is shifted as indicated by 113 in FIG. 13.

Therefore, the pulse width of the detection signal S46 may be (1) equal to or more than the pulse width of the detection signal S45 of AND gate 45 and (2) equal to or less than an interval Tfsw of a switching frequency fsw of the inverter circuit 12. As a result, it is possible to hold the high-level interval up to the output terminal of the detection signal S45 of the next AND gate 45 with the maximum value when OPG 46 outputs one pulse.

Next, the low-level interval of SWDS signal will be described below.

Figure 14:
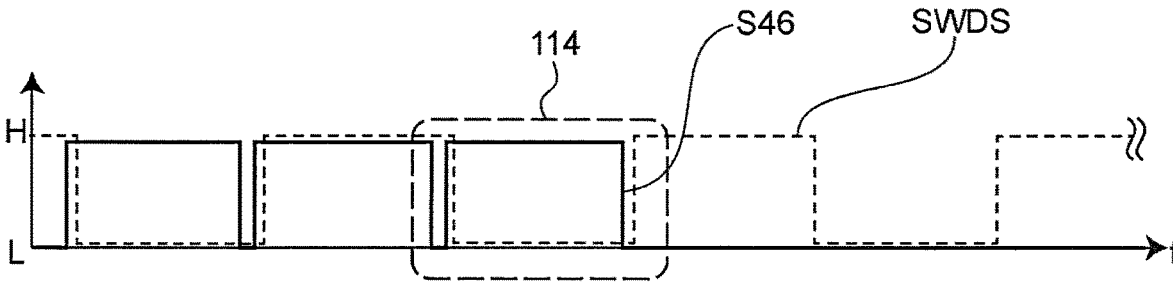
FIG. 14 is a timing chart illustrating a temporal relationship (NG case) between the detection signal S46 and SWDS signal for explaining setting of a low-level interval of SWDS signal in FIG. 2.
Figure 15:
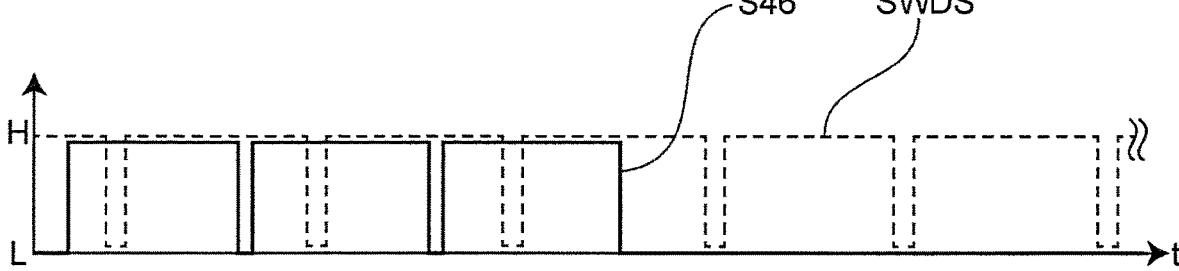
FIG. 15 is a timing chart illustrating a temporal relationship (OK case) between the detection signal S46 and SWDS signal for explaining the setting of the low-level interval of SWDS signal in FIG. 2.

FIG. 14 is a timing chart illustrating a temporal relationship (NG case) between the detection signal S46 and SWDS signal for explaining setting of the low-level interval of SWDS signal in FIG. 2. Furthermore, FIG. 15 is a timing chart illustrating a temporal relationship (OK case) between the detection signal S46 and SWDS signal for explaining the setting of the low-level interval of SWDS signal in FIG. 2.

The low-level interval of SWDS signal is set to be equal to or shorter than the high-level interval of the detection signal S45 of AND gate 45. This is because, as indicated by 114 of NG case in FIG. 14, when the low-level interval of SWDS signal is longer than the detection signal S45, there is a possibility that the switching detector and determiner circuit 47 detects both the low level and the high level of the binary signal of the detection signal S46 in the low-level interval of one pulse of SWDS signal. In this case, the operating frequency cannot be searched for correctly. On the other hand, OK case in FIG. 15 shows that the switching detector and determiner circuit 47 can detect either the low level or the high level of the binary signal of the detection signal S46 in the low-level interval of one pulse of SWDS signal.

Figure 16:
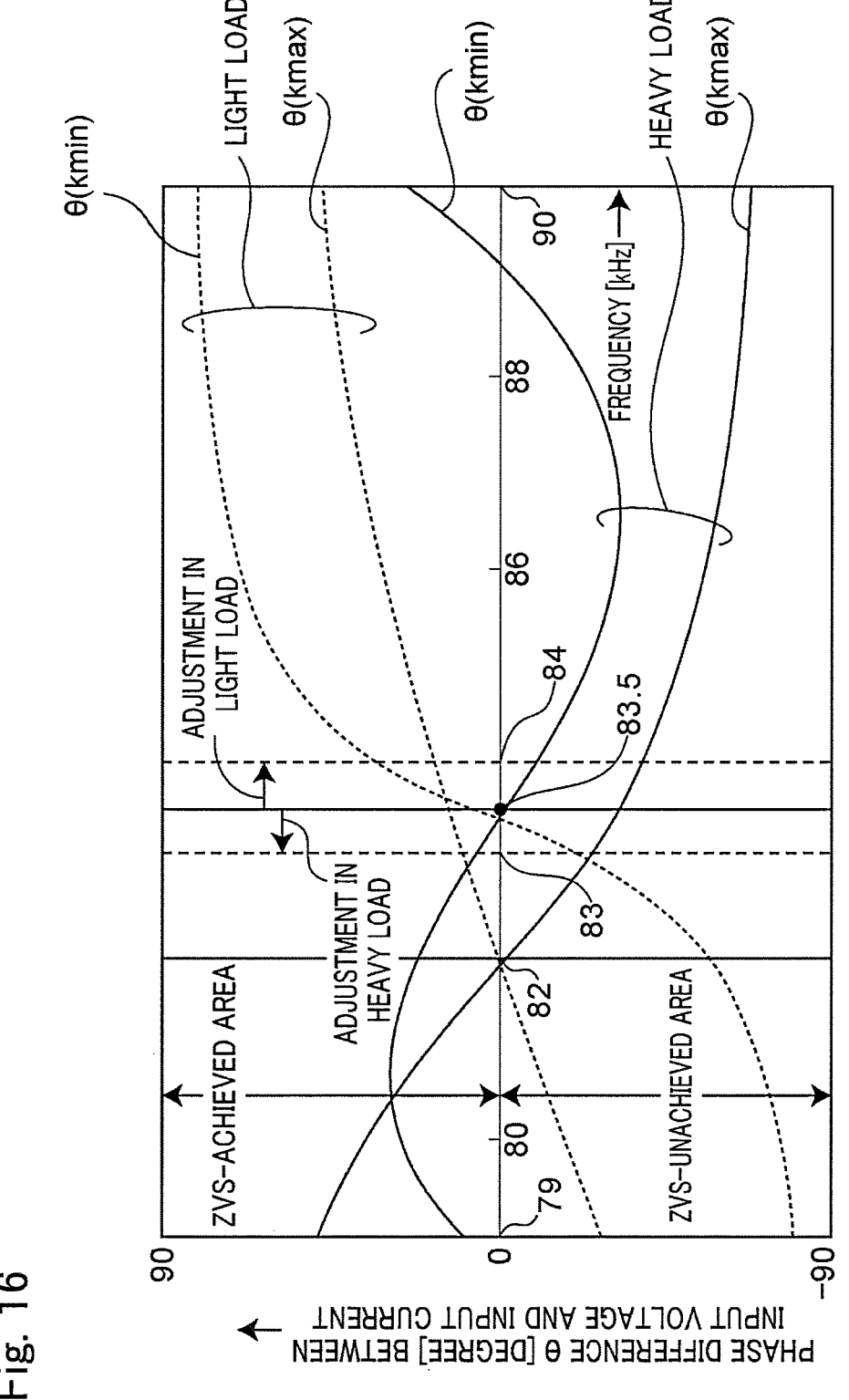
FIG. 16 is a graph illustrating frequency characteristics of a phase difference between an input voltage and an input current, illustrating an adjustment method for securing a margin for achieving zero-volt switching (ZVS) after a resonance frequency is detected in the frequency controller and driver 17 in FIG. 2.

FIG. 16 is a graph illustrating frequency characteristics of a phase difference between an input voltage and an input current (phase difference between the voltage applied to the power transmission LC resonance circuit 13 and the current flow to the power transmission LC resonance circuit 13), illustrating an adjustment method for securing a margin for achieving zero-volt switching (ZVS) after a resonance frequency is detected in the frequency controller and driver 17 in FIG. 2. As is apparent from FIG. 16, the composite resonance circuit according to the present embodiment has a resonance frequency at which the phase difference between the current flowing through the power transmission LC resonance circuit 13 and the voltage applied to the power transmission LC resonance circuit 13 is 0 and the power factor is 1 within the operating frequency range of the inverter circuit 12.

In the present embodiment, as described above, after the switching detector and determiner circuit 47 detects switching, the switching frequency controller circuit 48 searches for and adjusts the operating frequency in accordance with the magnitude of the load, and sets the operating frequency based on the resonance frequency that is the optimum operating frequency. In this case, as illustrated in FIG. 16, in the case of a heavy load (frequency of 83.5 kHz or less), it is preferable to perform control so as to lower the operating frequency to such an extent that the transmission efficiency or the input power factor does not significantly decrease (for example, 0.5 to 1 kHz). On the other hand, in the case of a light load (frequency of 83.5 kHz or more), it is preferable to perform control so as to increase the operating frequency to such an extent that the transmission efficiency or the input power factor does not significantly decrease (for example, 0.5 to 1 kHz).

Next, a specific example of frequency search and power feeding start processing executed by the non-contact power supply system and the frequency controller and driver 17 in FIG. 1 will be described below.

Figure 17:
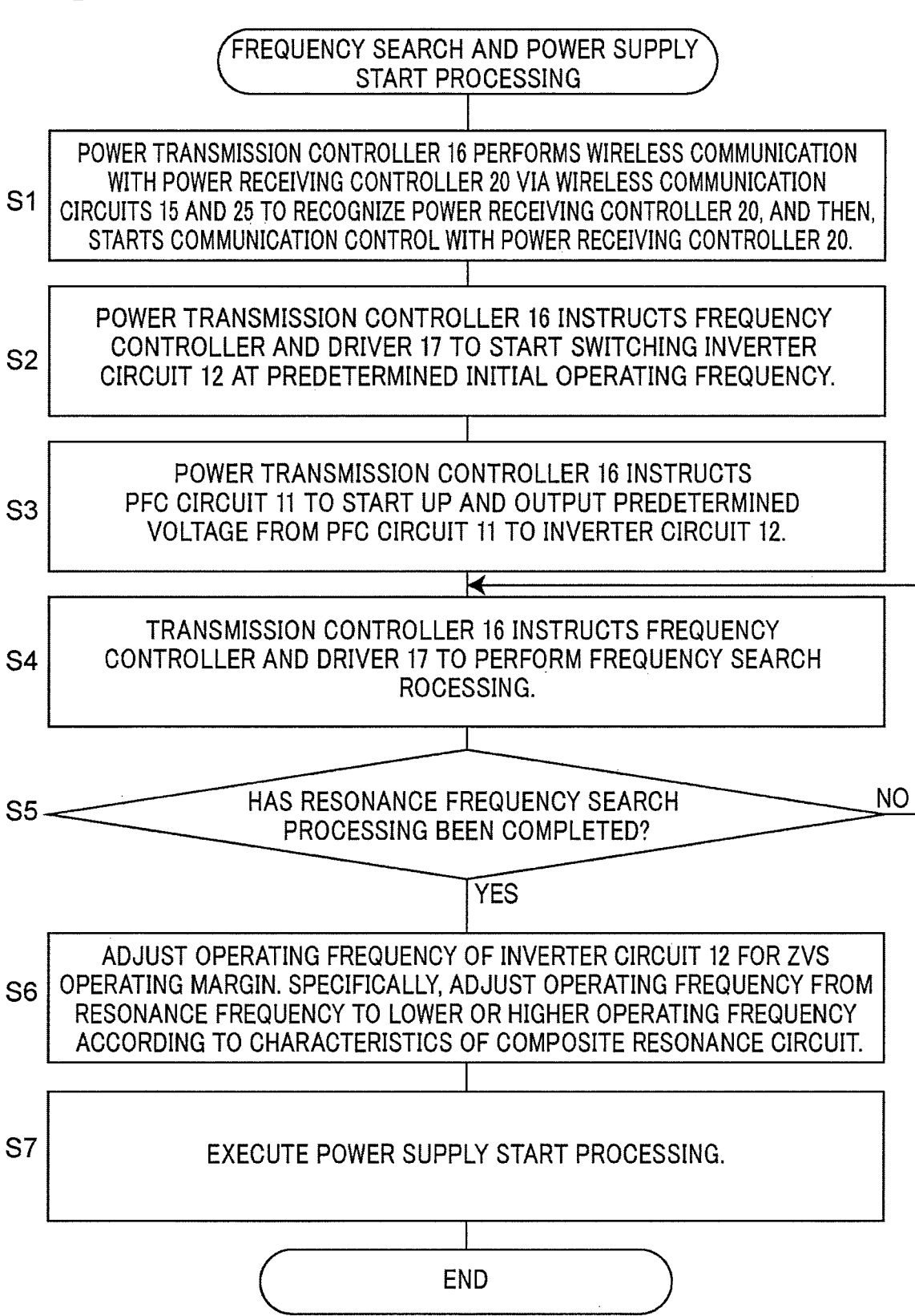
FIG. 17 is a flowchart illustrating frequency search and power feeding start processing executed by the non-contact power supply system in FIG. 1.

FIG. 17 is a flowchart illustrating frequency search and power feeding start processing executed by the non-contact power supply system in FIG. 1.

In step S1 in FIG. 17, first of all, the power transmission controller 16 performs wireless communication with the power receiving control unit 20 via the wireless communication circuits 15 and 25, recognizes the power receiving control unit 20, and starts communication control with the power receiving control unit 20. Next, in step S2, the power transmission controller 16 instructs the frequency controller and driver 17 to start switching of the inverter circuit 12 at a predetermined initial operating frequency, and in step S3, the power transmission controller 16 activates PFC circuit 11 and instructs PFC circuit 11 to output a predetermined voltage to the inverter circuit 12. Then, in step S4, the power transmission controller 16 causes the frequency controller and driver 17 to execute the frequency search processing.

Next, in step S5, it is determined whether or not the search processing of the resonance frequency has been completed. When YES, the process proceeds to step S6, whereas when NO, the process returns to step S4. In step S6, the operating frequency of the inverter circuit 12 is adjusted for the operating margin of zero-volt switching (ZVS). Specifically, the operating frequency is adjusted to be lower or higher than the resonance frequency by a predetermined frequency change amount $\Delta f$ (a positive value sufficiently smaller than the operating frequency) according to the characteristics of the composite resonance circuit. Further, after the power feeding start process is executed in step S7, the frequency search and power feeding start processing is terminated.

First of all, as an example of the frequency search processing, frequency search processing by a "sweep method" will be described below.

Figure 18A:
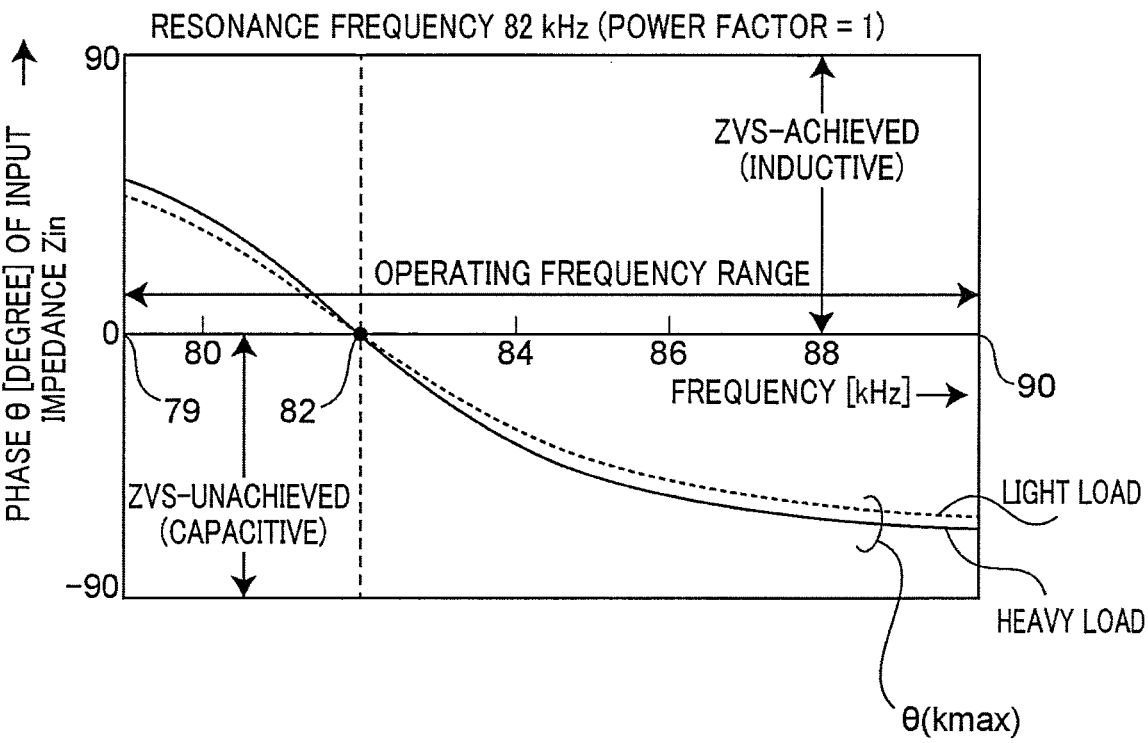
FIG. 18A is a graph illustrating frequency characteristics of a phase θ of an input impedance Zin, illustrating a frequency search method by a sweep method.

FIG. 18A is a graph illustrating frequency characteristics of a phase $\theta$ of an input impedance Zin, illustrating the frequency search method by the sweep method. Further, FIG. 18B is a waveform diagram of the input current at the resonance frequency in FIG. 18A.

Figure 18B:
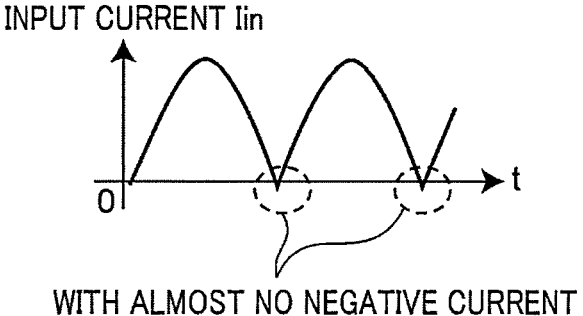
FIG. 18B is a waveform diagram of an input current at a resonance frequency in FIG. 18A.

As illustrated in FIG. 18A, the sweep method is a method of periodically changing the operating frequency once in one direction, for example, and searching for an operating frequency at which no negative current flows through the input current Iin (see FIG. 18B). Since the sweep method changes the operating frequency once in one direction, the load-independent point of the resonance frequency can be searched for in a shorter time than a hill climbing method described later, but the search may not be accurately performed depending on the resolution of the operating frequency.

FIG. 19 is a flowchart illustrating the frequency search processing by the sweep method (in a case of starting from the lower limit of the operating frequency, the subroutine in FIG. 17) executed by the frequency controller and driver 17 in FIG. 2.

In step S11 in FIG. 19, first, the input current signal SIin indicating the input current Iin is detected, and in step S12, it is determined whether Iin≥Iinth. When YES, the process proceeds to step S13, whereas when NO, the process proceeds to step S14. In this case, Iinth is an input current threshold value for negative current determination, and is, for example, 0 or a value near 0. Next, in step S13, it is determined whether Iin≥Iinth is continuously satisfied a predetermined "n" times by using SWDS signal. When YES, the process proceeds to step S15, whereas when NO, the process proceeds to step S14. In step S14, the operating frequency (switching frequency) fsw of the inverter circuit 12 is heightened by the predetermined frequency change amount $\Delta f$, and then the process returns to step S11. Further, in step S15, it is determined that the current operating frequency is the resonance frequency, and the resonance frequency of the composite resonance circuit has been searched for, the frequency search processing is terminated, and the process returns to the original main routine.

Figure 20:
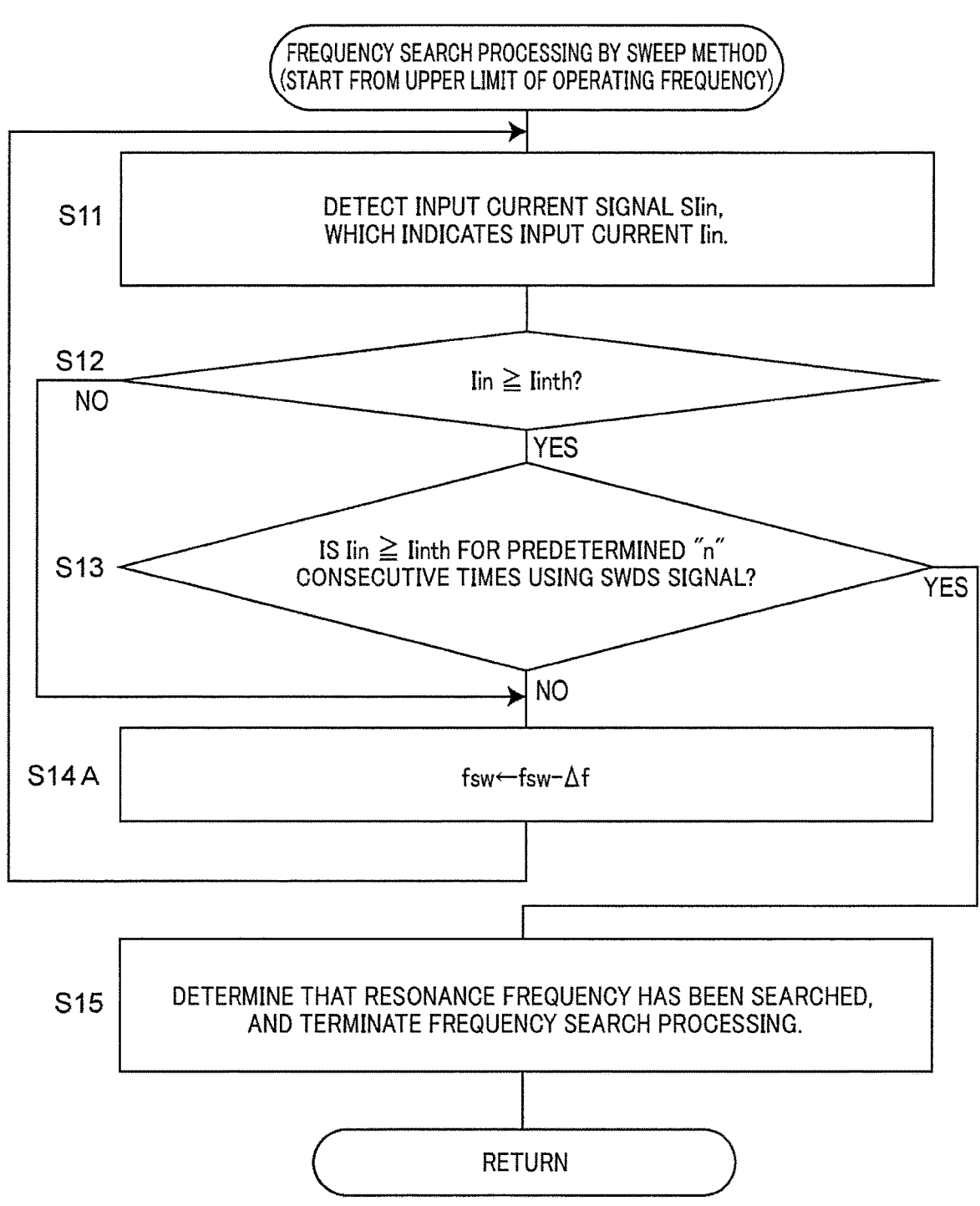
FIG. 20 is a flowchart illustrating frequency search processing by the sweep method (in a case of starting from an upper limit of an operating frequency) executed by the frequency controller and driver 17 in FIG. 2.

FIG. 20 is a flowchart illustrating the frequency search processing by the sweep method (in a case of starting from the upper limit of the operating frequency, the subroutine in FIG. 17) executed by the frequency controller and driver 17 in FIG. 2. The frequency search processing in FIG. 20 is different from the frequency search processing in FIG. 19 in the following points.

(1) Instead of step S14, step S14A is included. In step S14A, the operating frequency (switching frequency) fsw of the inverter circuit 12 is lowered by the predetermined frequency change amount $\Delta f$.

As described above, the resonance frequency of the composite resonance circuit can be searched for by executing the frequency search processing by the sweep method in FIG. 19 or 20.

Next, as an example of the frequency search processing, the frequency search processing by the "hill climbing method" will be described below.

Figure 21A:
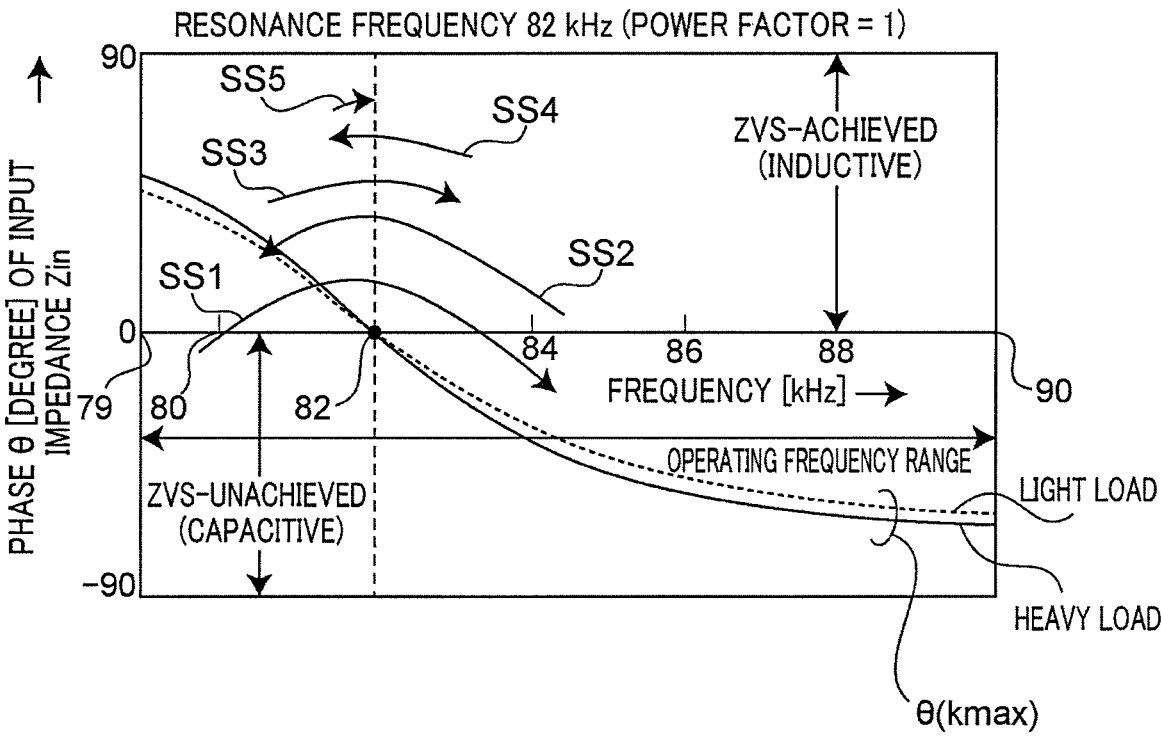
FIG. 21A is a graph illustrating frequency characteristics of a phase θ of an input impedance Zin, illustrating a frequency search method by a hill climbing method.
Figure 21B:
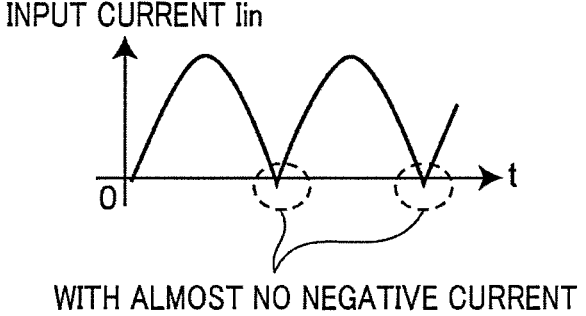
FIG. 21B is a waveform diagram of an input current at a resonance frequency in FIG. 21A.

FIG. 21A is a graph illustrating frequency characteristics of a phase $\theta$ of an input impedance Zin, illustrating the frequency search method by the hill climbing method. Further, FIG. 21B is a waveform diagram of the input current at the resonance frequency in FIG. 21A. In the hill climbing method, as indicated by SS1 to SS5 in FIG. 21A, the operating frequency is changed in one direction from a preset operating frequency. Then, when a pattern having a sequence of a negative current, no negative current (a resonance frequency, see FIG. 21B), and a negative current in the input current Iin is detected, it is determined that the current has passed the resonance frequency, and the direction of the change in the operating frequency is reversed. Then, the operating frequency change amount $\Delta f$ is decreased by a predetermined decrement value $\Delta fd$ every time it is inverted, and this is repeated to search for the resonance frequency. Therefore, in the hill climbing method, the accuracy of the frequency search can be improved by repeating the sweep method.

Figure 22A:
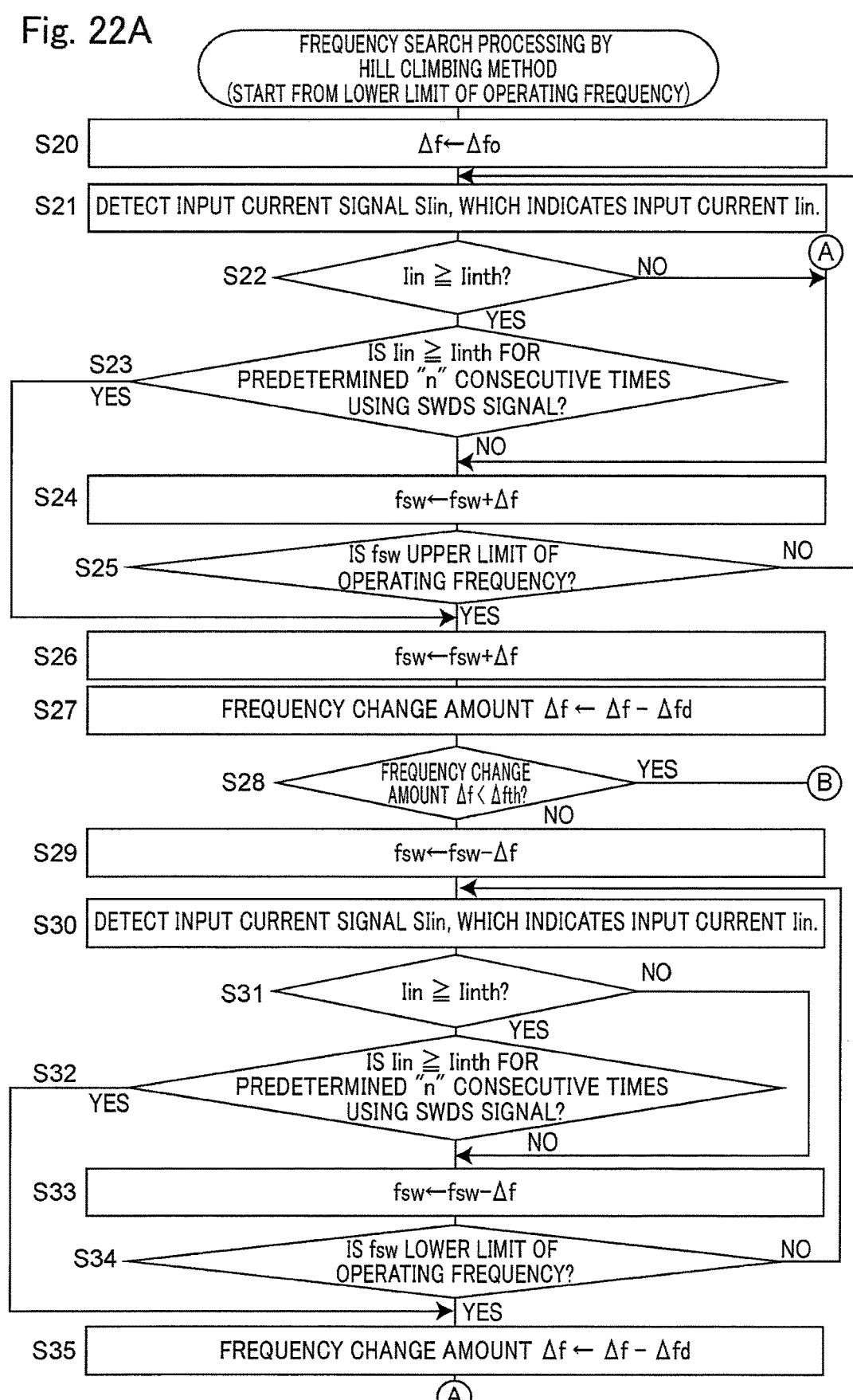
FIG. 22A is a flowchart illustrating a first part of the frequency search processing by the hill climbing method (in a case of starting from a lower limit of an operating frequency) executed by the frequency controller and driver 17 in FIG. 2.
Figure 22B:
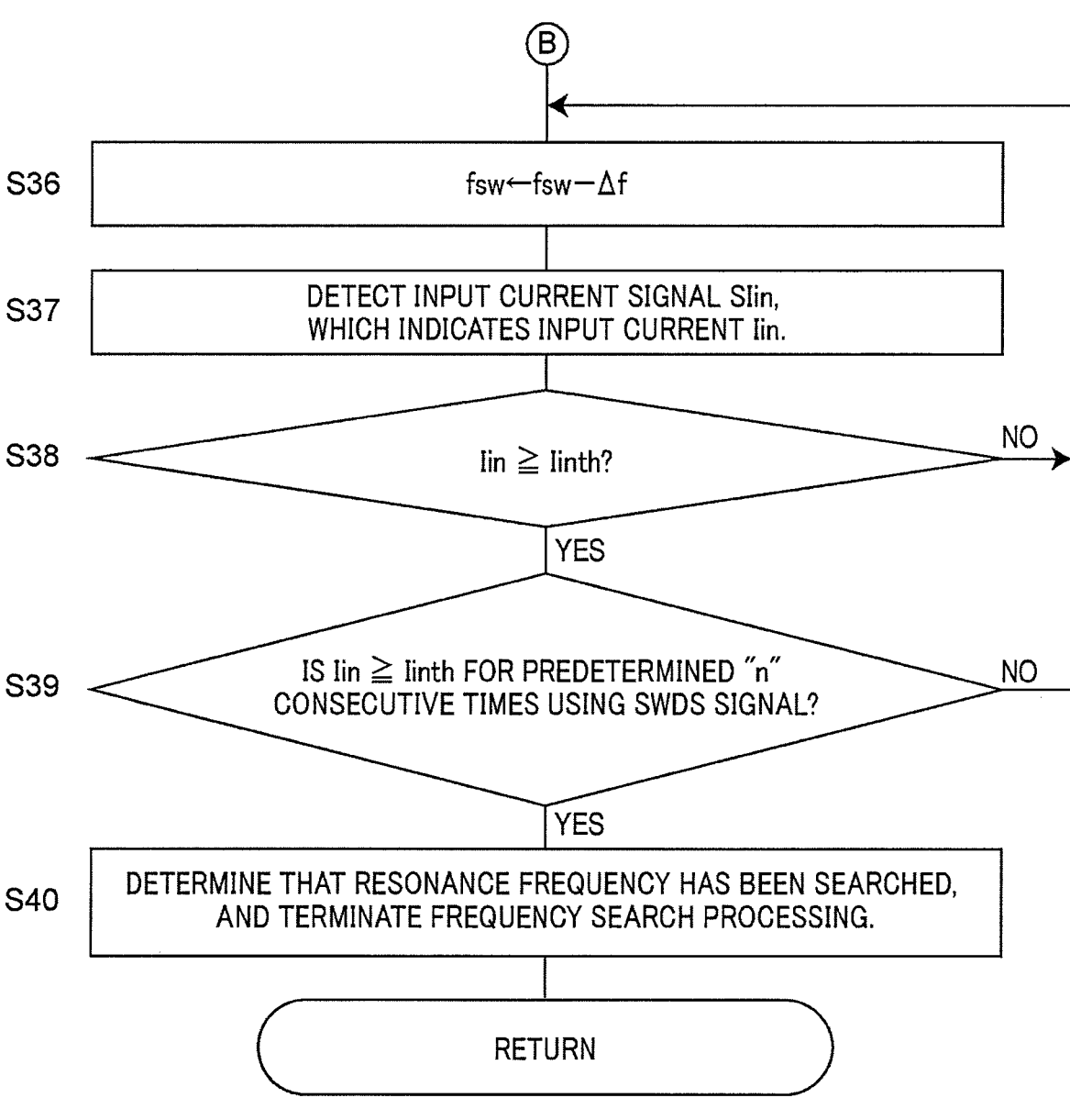
FIG. 22B is a flowchart illustrating a second part of the frequency search processing by the hill climbing method (in a case of starting from the lower limit of the operating frequency) executed by the frequency controller and driver 17 in FIG. 2.

FIGS. 22A and 22B are flowcharts illustrating the frequency search processing by the hill climbing method (in a case of starting from the lower limit of the operating frequency, the subroutine in FIG. 17) executed by the frequency controller and driver 17 in FIG. 2.

In step S20 in FIG. 22A, first of all, an initial frequency change amount $\Delta f0$ is set to the frequency change amount $\Delta f$, and then, in step S21, the input current signal SIin indicating the input current Iin is detected. In step S22, it is determined whether Iin≥Iinth. When YES, the process proceeds to step S23, whereas when NO, the process proceeds to step S24. In this case, Iinth is an input current threshold value for negative current determination, and is, for example, 0 or a value near 0 (a positive value or a negative value). In step S23, it is determined whether Iin≥Iinth is continuously satisfied a predetermined "n" times by using SWDS signal. When YES, the process proceeds to step S26, whereas when NO, the process proceeds to step S24. After the operating frequency fsw is set to be heightened by the frequency change amount $\Delta f$ in step S24, it is determined in step S25 whether the operating frequency fsw is the upper limit of the operating frequency. When YES, the process proceeds to step S26, whereas when NO, the process returns to step S21.

After the operating frequency fsw is set to be heightened by the frequency change amount $\Delta f$ in step S26, the frequency change amount $\Delta f$ is set to be decreased by the decrement value $\Delta fd$ in step S27. It is determined in step S28 whether the frequency change amount $\Delta f < \Delta fth$ (whether the point is close to the extreme value in view of the search accuracy in the hill climbing method). When YES, the process proceeds to step S36 in FIG. 22B. When NO, the process proceeds to step S29. In this case, Δfth is a threshold value of the frequency change amount Δf and is set to a positive value sufficiently smaller than the initial frequency change amount Δf0.

After the operating frequency fsw is set to be lowered by the frequency change amount Δf in step S29, the input current signal SIin indicating the input current Iin is detected in step S30, and whether Iin>Iinth is determined in step S31. In this case, when YES, the process proceeds to step S32, whereas when NO, the process proceeds to step S33.

In step S32, it is determined whether Iin≥Iinth is continuously satisfied a predetermined "n" times by using SWDS signal. When YES, the process proceeds to step S35, whereas when NO, the process proceeds to step S33. After the operating frequency fsw is set to be lowered by the frequency change amount Δf in step S33, it is determined in step S34 whether the operating frequency fsw is the lower limit of the operating frequency. When YES, the process proceeds to step S35, whereas when NO, the process returns to step S30. After the frequency change amount Δf is set to be decreased by the decrement value Δfd in step S35, and then the process returns to step S24.

After the operating frequency fsw is set to be lowered by the frequency change amount Δf in step S36 in FIG. 22B, the input current signal SIin indicating the input current Iin is detected in step S37, and whether Iin≥Iinth is determined in step S38. In this case, when YES, the process proceeds to step S40, whereas when NO, the process returns to step S36. Next, in step S39, it is determined whether Iin≥Iinth is continuously satisfied a predetermined "n" times by using SWDS signal. When YES, the process proceeds to step S40, whereas when NO, the process returns to step S36. In step S40, it is determined that the current operating frequency is the resonance frequency of the composite resonance circuit and the resonance frequency has been searched for, the frequency search processing is terminated, and the process returns to the original main routine.

As described above, according to the frequency search processing in FIGS. 22A and 22B, it is possible to search for the resonance frequency of the composite resonance circuit while changing the operating frequency using the hill climbing method.

Figure 23A:
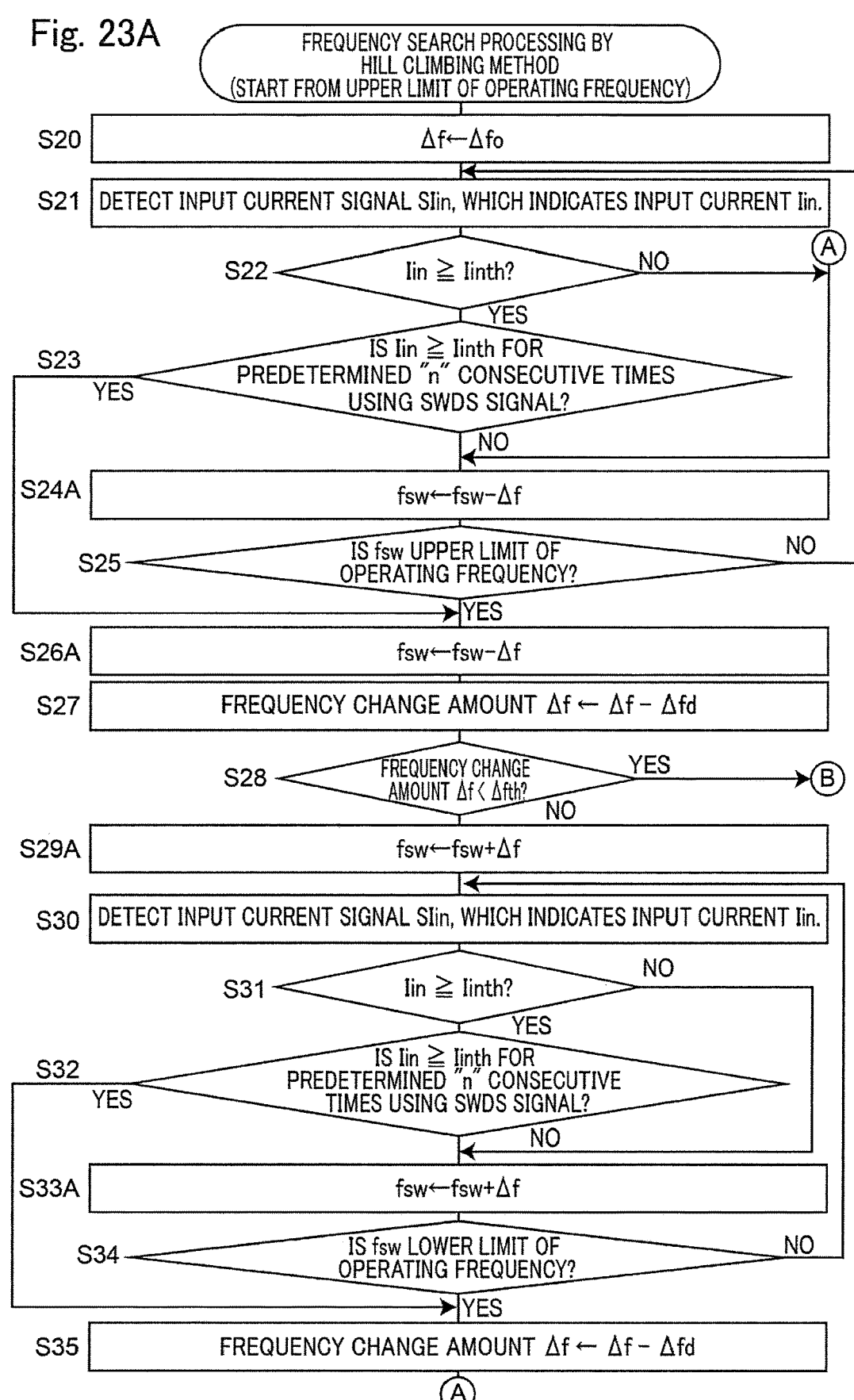
FIG. 23A is a flowchart illustrating a first part of the frequency search processing by the hill climbing method (in a case of starting from an upper limit of the operating frequency) executed by the frequency controller and driver 17 in FIG. 2.
Figure 23B:
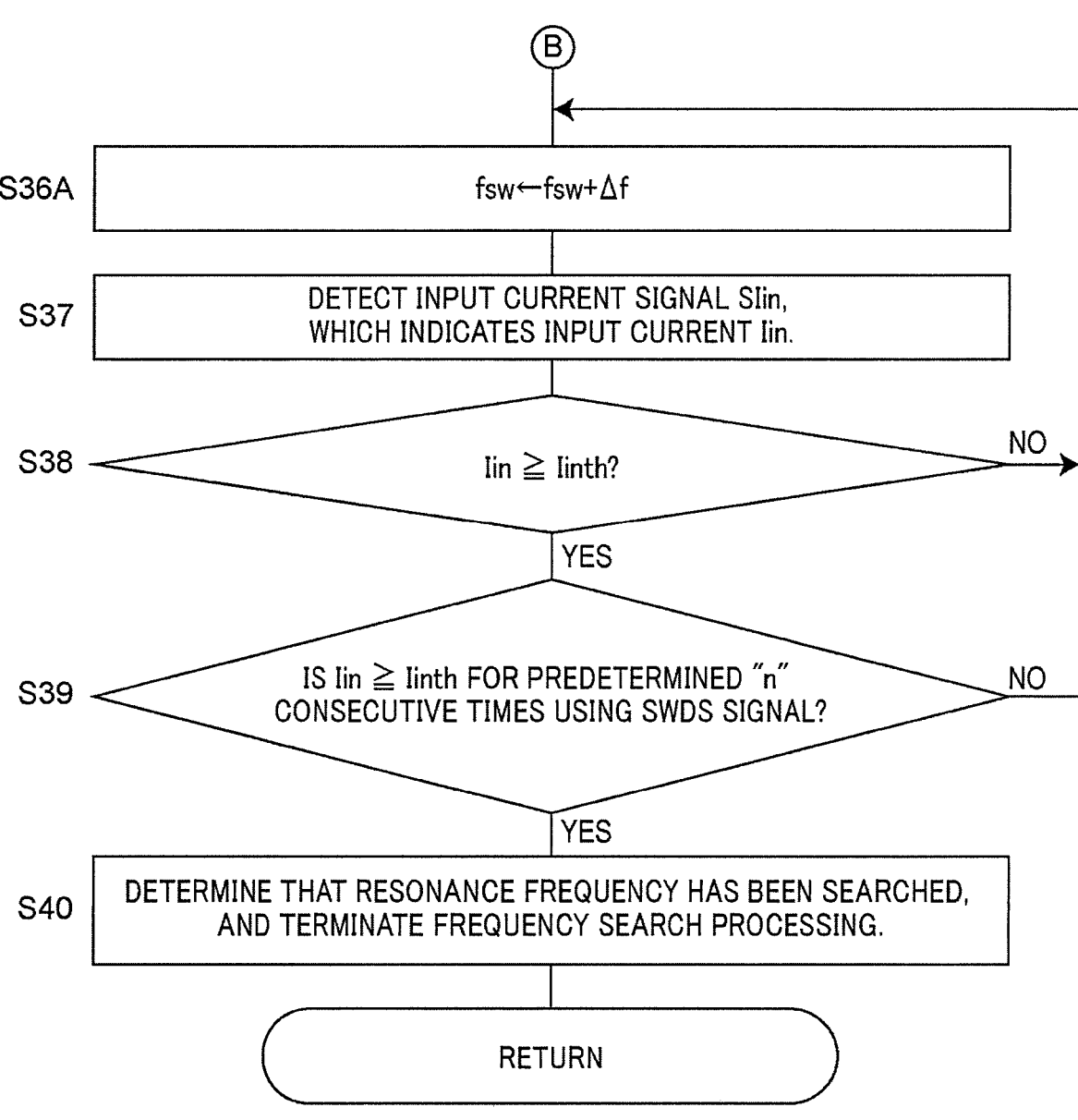
FIG. 23B is a flowchart illustrating a second part of the frequency search processing by the hill climbing method (in a case of starting from the upper limit of the operating frequency) executed by the frequency controller and driver 17 in FIG. 2.

FIGS. 23A and 23B are flowcharts illustrating the frequency search processing by the hill climbing method (in a case of starting from the upper limit of the operating frequency, the subroutine in FIG. 17) executed by the frequency controller and driver 17 in FIG. 2. The frequency search processing in FIGS. 23A and 23b is different from the frequency search processing in FIGS. 22A and 22B in the following points.

(1) Steps S24 and S26 are replaced with steps S24A and S26A, respectively. In steps S24A and S26A, the operating frequency fsw is set to be lowered by the frequency change amount Δf.

(2) Steps S29, S33, and S36 are replaced with steps S29A, S33A, and 3S36A, respectively. In steps S29A, S33A, and S36A, the operating frequency fsw is set to be heightened by the frequency change amount Δf.

As described above, according to the frequency search processing in FIGS. 23A and 23B, it is possible to search for the resonance frequency of the composite resonance circuit while changing the operating frequency using the hill climbing method.

As described above, according to the drive control apparatus 50 for the composite resonance circuit according to the present embodiment, even if the coupling degree "k" between the inductors L1 and L2, the inductor L1, and the like change, the inverter circuit 12 can be operated at the resonance frequency that is the power factor of 1. Accordingly, the zero-volt switching (ZVS) in the composite resonance circuit can be realized. Therefore, the operating frequency can be controlled to be optimized in a shorter time than that of the related art according to the fluctuation in the positional relationship between the power transmitting and receiving coils of the composite resonance circuit.

In addition, DC-to-DC converter 23 of the power receiving apparatus 200 for maximizing the transmission efficiency can be eliminated by configuring the non-contact power supply system using the drive control apparatus 50 for the composite resonance circuit. Referring to FIG. 1, DC-to-DC converter 23 is inserted for modified embodiments but may be deleted in the present embodiment as described later in detail. In addition, in order to maximize the efficiency in the power transmission apparatus 100, it is unnecessary to perform impedance matching by DC-to-DC converter 23 in the power receiving apparatus 200.

In the above embodiment, the sweep method or the hill climbing method is used as the method of searching for the resonance frequency of the composite resonance circuit, but the present invention is not limited thereto, and various other known extreme value search methods may be used.

Modified Embodiments of Non-Contact Power Supply System

FIG. 1 illustrates the configuration example of the non-contact power supply system according to the embodiment. The present invention is not limited thereto and may be configured as follows.

TABLE 1

|  | Case 1 | Case 2 | Case 3 | Case 4 |
|---|---|---|---|---|
| PFC Circuit | Present | Absent (Note 1) | Absent (Note 1) | Present |
| DC-to-DC Converter | Present | Present | Absent (Note 2) | Absent (Note 2) |
| Wireless communication circuit | Present or Absent | Present or Absent | Present or Absent | Present or Absent |

(Note 1)
In case of no PFC circuit 11, PFC circuit 11 is replaced with a rectifying circuit. In this case, the power transmission controller 16 does not include PFC control unit.
(Note 2)
The power receiving control unit 20 is unnecessary in case of no DC-to-DC converter 23, the rectifying circuit 22 including only a diode, and no PFC circuit 11. In this case, the wireless communication circuits 15 and 25 are unnecessary.

Embodiment and Modified Embodiments of Composite Resonance Circuit

Hereinafter, configuration examples of composite resonance circuits used in the embodiment and the modified embodiments will be described. It is noted that the following modified embodiments are examples, and calibration may be performed using other various LC resonance circuits.

FIG. 24A is a circuit diagram illustrating the configuration example of the composite resonance circuit according to the embodiment. Referring to FIG. 24A, the composite resonance circuit includes the power transmission LC resonance circuit 13 including a series circuit of the inductor L1 and the capacitor C1, and the power receiving LC resonance circuit 14 including a series circuit of the inductor L2 and the capacitor C2.

Figure 24B:
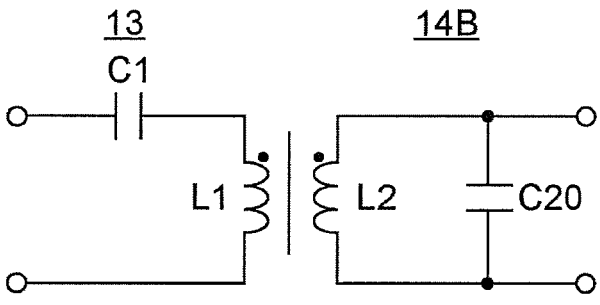
FIG. 24B is a circuit diagram illustrating a configuration example of a composite resonance circuit according to a first modified embodiment.

FIG. 24B is a circuit diagram illustrating a configuration example of a composite resonance circuit according to a first modified embodiment. Referring to FIG. 24B, the composite resonance circuit includes the power transmission LC resonance circuit 13 including a series circuit of the inductor L1 and the capacitor C1, and a power receiving LC resonance circuit 14B including a parallel circuit of the inductor L2 and a capacitor C20.

Figure 24C:
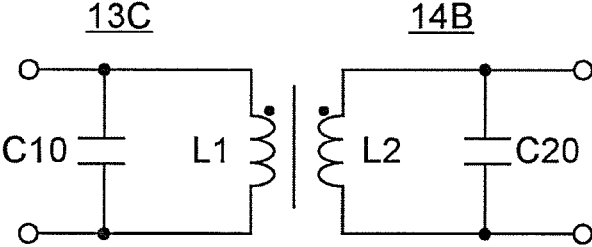
FIG. 24C is a circuit diagram illustrating a configuration example of a composite resonance circuit according to a second modified embodiment.

FIG. 24C is a circuit diagram illustrating a configuration example of a composite resonance circuit according to a second modified embodiment. Referring to FIG. 24C, the composite resonance circuit includes a power transmission LC resonance circuit 13C including a parallel circuit of the inductor L1 and a capacitor C10, and the power receiving LC resonance circuit 14B including a parallel circuit of the inductor L2 and the capacitor C20.

Figure 24D:
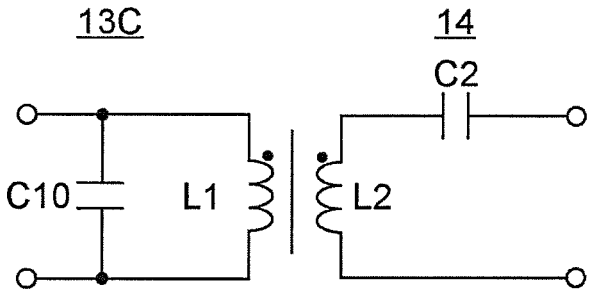
FIG. 24D is a circuit diagram illustrating a configuration example of a composite resonance circuit according to a third modified embodiment.

FIG. 24D is a circuit diagram illustrating a configuration example of a composite resonance circuit according to a third modified embodiment. Referring to FIG. 24D, the composite resonance circuit includes the power transmission LC resonance circuit 13C including a parallel circuit of the inductor L1 and the capacitor C10, and the power receiving LC resonance circuit 14 including a series circuit of the inductor L2 and the capacitor C2.

FIG. 24E is a circuit diagram illustrating a configuration example of a composite resonance circuit according to a fourth modified embodiment. Referring to FIG. 24E, the composite resonance circuit includes the power transmission LC resonance circuit 13 including a series circuit of the inductor L1 and the capacitor C1, and a power receiving LC resonance circuit 14E including a series circuit of the inductor L2 and the capacitors C2 and C20.

FIG. 24F is a circuit diagram illustrating a configuration example of a composite resonance circuit according to a fifth modified embodiment. Referring to FIG. 24F, the composite resonance circuit includes the power transmission LC resonance circuit 13C including a parallel circuit of the inductor L1 and the capacitor C10, and the power receiving LC resonance circuit 14E including a series circuit of the inductor L2 and the capacitors C2 and C20.

FIG. 24G is a circuit diagram illustrating a configuration example of a composite resonance circuit according to a sixth modified embodiment. Referring to FIG. 24G, the composite resonance circuit includes a power transmission LC resonance circuit 13G including a series circuit of the inductor L1 and the capacitors C1 and C10, and the power receiving LC resonance circuit 14 including a series circuit of the inductor L2 and the capacitor C2.

FIG. 24H is a circuit diagram illustrating a configuration example of a composite resonance circuit according to a seventh modified embodiment. Referring to FIG. 24H, the composite resonance circuit includes the power transmission LC resonance circuit 13G including a series circuit of the inductor L1 and the capacitors C1 and C10, and the power receiving LC resonance circuit 14B including a parallel circuit of the inductor L2 and the capacitor C20.

Figure 24I:
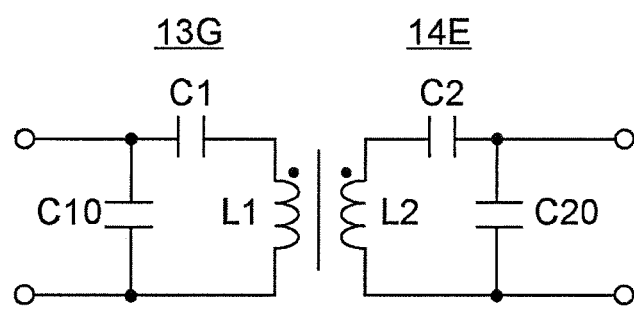
FIG. 24I is a circuit diagram illustrating a configuration example of a composite resonance circuit according to an eighth modified embodiment.

FIG. 24I is a circuit diagram illustrating a configuration example of a composite resonance circuit according to an eighth modified embodiment. Referring to FIG. 24I, the composite resonance circuit includes a power transmission LC resonance circuit 13G including a series circuit of the inductor L1 and the capacitors C1 and C10, and the power receiving LC resonance circuit 14E including a series circuit of the inductor L2 and the capacitors C2 and C20.

Figure 24J:
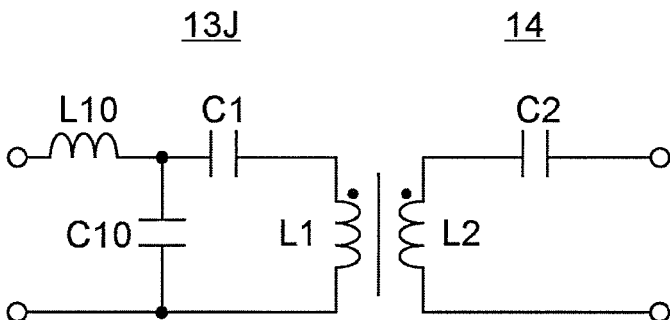
FIG. 24J is a circuit diagram illustrating a configuration example of a composite resonance circuit according to a ninth modified embodiment.

FIG. 24J is a circuit diagram illustrating a configuration example of a composite resonance circuit according to a ninth modified embodiment. Referring to FIG. 24J, the composite resonance circuit includes a power transmission LC resonance circuit 13J further including an inductor L10 in the series circuit of the inductor L1 and the capacitors C1 and C10, and the power receiving LC resonance circuit 14 including a series circuit of the inductor L2 and the capacitor C2.

Figure 24K:
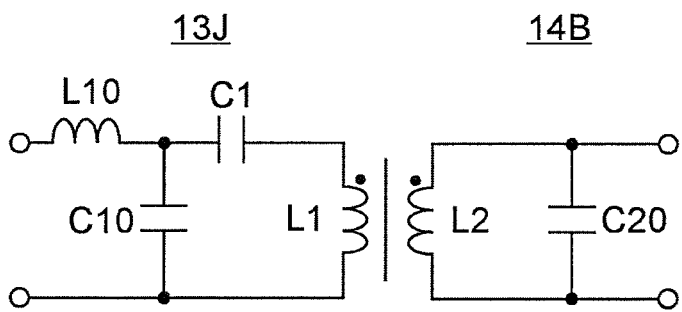
FIG. 24K is a circuit diagram illustrating a configuration example of a composite resonance circuit according to a tenth modified embodiment.

FIG. 24K is a circuit diagram illustrating a configuration example of a composite resonance circuit according to a tenth modified embodiment. Referring to FIG. 24K, the composite resonance circuit includes the power transmission LC resonance circuit 13J further including the inductor L10 in the series circuit of the inductor L1 and the capacitors C1 and C10, and the power receiving LC resonance circuit 14B including a parallel circuit of the inductor L2 and the capacitor C20.

Figure 24L:
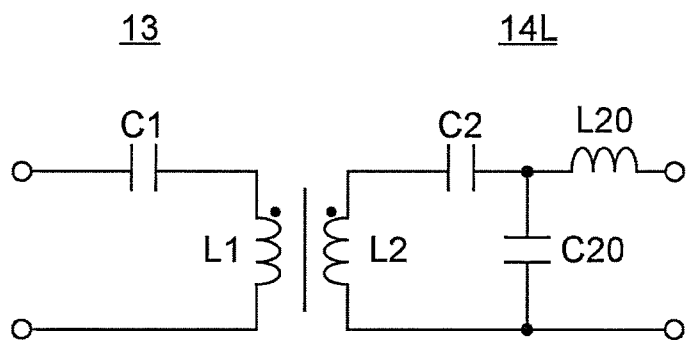
FIG. 24L is a circuit diagram illustrating a configuration example of a composite resonance circuit according to an eleventh modified embodiment.

FIG. 24L is a circuit diagram illustrating a configuration example of a composite resonance circuit according to an eleventh modified embodiment. Referring to FIG. 24L, the composite resonance circuit includes the power transmission LC resonance circuit 13 including a series circuit of the inductor L1 and the capacitor C1, and a power receiving LC resonance circuit 14L further including an inductor L20 in the series circuit of the inductor L2 and the capacitors C2 and C20.

Figure 24M:
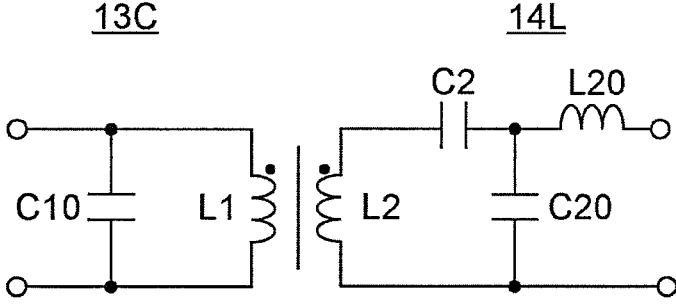
FIG. 24M is a circuit diagram illustrating a configuration example of a composite resonance circuit according to a twelfth modified embodiment.

FIG. 24M is a circuit diagram illustrating a configuration example of a composite resonance circuit according to a twelfth modified embodiment. Referring to FIG. 24M, the composite resonance circuit includes the power transmission LC resonance circuit 13C including a parallel circuit of the inductor L1 and the capacitor C10, and the power receiving LC resonance circuit 14L further including the inductor L20 in the series circuit of the inductor L2 and the capacitors C2 and C20.

Figure 24N:
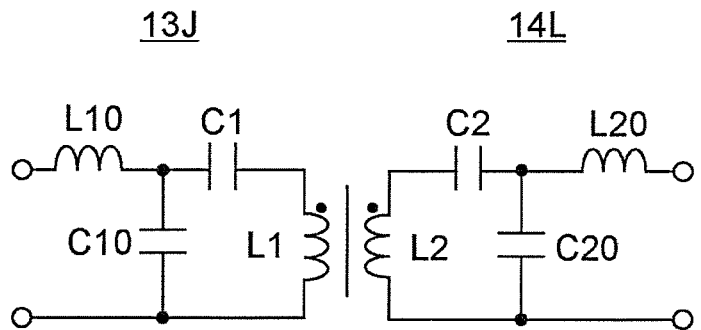
FIG. 24N is a circuit diagram illustrating a configuration example of a composite resonance circuit according to a thirteenth modified embodiment.

FIG. 24N is a circuit diagram illustrating a configuration example of a composite resonance circuit according to a thirteenth modified embodiment. Referring to FIG. 24N, the composite resonance circuit includes the power transmission LC resonance circuit 13J further including the inductor L10 in the series circuit of the inductor L1 and the capacitors C1 and C10, and the power receiving LC resonance circuit 14L further including the inductor L20 in the series circuit of the inductor L2 and the capacitors C2 and C20.

Modified Embodiments of Rectifying Circuit

Hereinafter, configuration examples of rectifying circuits according to modified embodiments will be described. It is noted that the following modified embodiments are examples, and calibration may be performed using other various rectifying circuits.

Figure 25A:
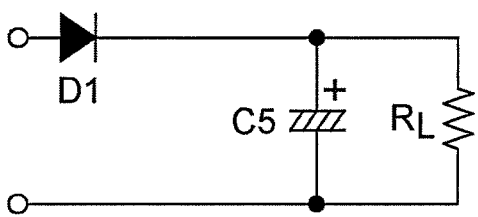
FIG. 25A is a circuit diagram illustrating a configuration example of a rectifying circuit according to a fourteenth modified embodiment.

FIG. 25A is a circuit diagram illustrating a configuration example of a rectifying circuit according to a fourteenth modified embodiment. The rectifying circuit in FIG. 25A includes a rectifying diode D1 and a smoothing electrolytic capacitor C5 to configure a half-wave rectifying circuit.

Figure 25B:
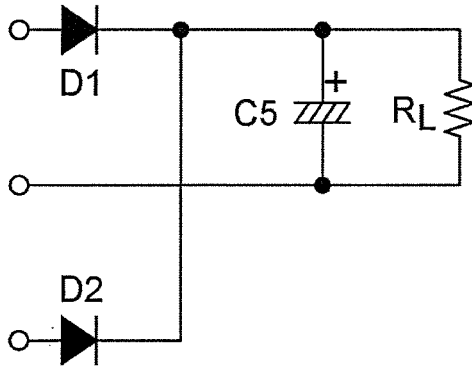
FIG. 25B is a circuit diagram illustrating a configuration example of a rectifying circuit according to a fifteenth modified embodiment.

FIG. 25B is a circuit diagram illustrating a configuration example of a rectifying circuit according to a fifteenth modified embodiment. The rectifying circuit in FIG. 25B includes rectifying diodes D1 and D2 and the smoothing electrolytic capacitor C5 to configure a full-wave rectifying circuit.

Figure 25C:
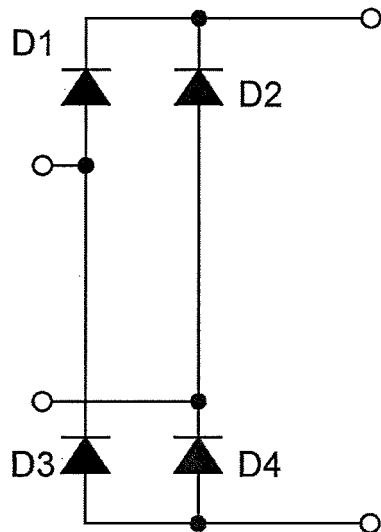
FIG. 25C is a circuit diagram illustrating a configuration example of a rectifying circuit according to a sixteenth modified embodiment.

FIG. 25C is a circuit diagram illustrating a configuration example of a rectifying circuit according to a sixteenth modified embodiment. The rectifying circuit in FIG. 25C includes the rectifying diodes D1, D2, D3, and D4 to configure a full-bridge rectifying circuit.

Figure 25D:
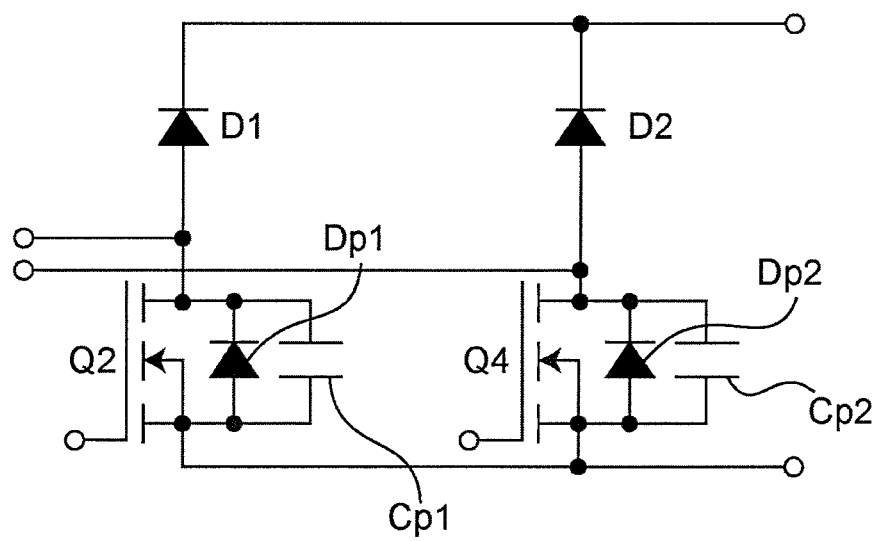
FIG. 25D is a circuit diagram illustrating a configuration example of a rectifying circuit according to a seventeenth modified embodiment.

FIG. 25D is a circuit diagram illustrating a configuration example of a rectifying circuit according to a seventeenth modified embodiment. The rectifying circuit in FIG. 25D includes the rectifying diodes D1 and D2, the MOS transistors Q1 and Q2, and the smoothing electrolytic capacitor C5 to configure a half-active rectifying circuit. In this case, Cp1 and Cp2 are parasitic capacitors, and Dp1 and Dp2 are parasitic diodes. In the half-active rectifying circuit, the output power can be adjusted by having a short-circuit mode as known. It is noted that configurations of upper and lower arms may be reversed.

Figure 25E:
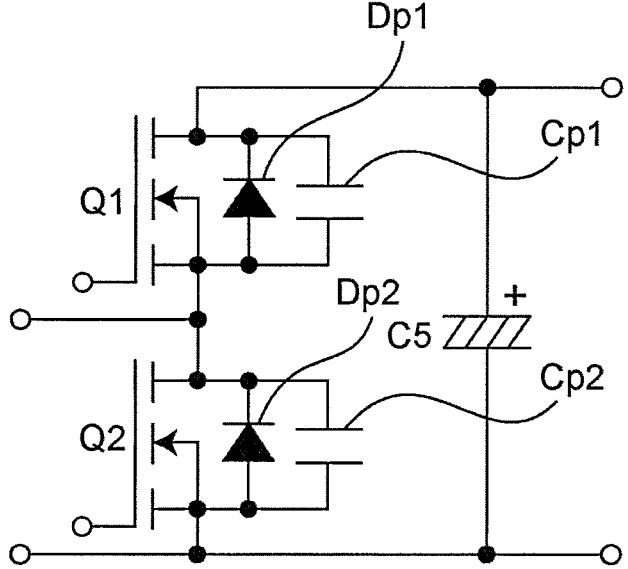
FIG. 25E is a circuit diagram illustrating a configuration example of a rectifying circuit according to an eighteenth modified embodiment.

FIG. 25E is a circuit diagram illustrating a configuration example of a rectifying circuit according to an eighteenth modified embodiment. The rectifying circuit in FIG. 25E includes the MOS transistors Q1 and Q2 and the smoothing electrolytic capacitor C5 to configure a voltage doubler rectifying circuit. In this case, Cp1 and Cp2 are parasitic capacitors, and Dp1 and Dp2 are parasitic diodes. It is noted that the MOS transistors Q1 and Q2 may be replaced with diodes.

In the above embodiment and modified embodiments, the composite resonance circuit including the two LC resonance circuits electromagnetically coupled to each other is used, but the present invention is not limited thereto, and a plurality of LC resonance circuits electromagnetically coupled to each other may be used.

INDUSTRIAL APPLICABILITY

As described above in detail, according to the drive control apparatus 50 for the composite resonance circuit according to the present invention, it is possible to control the operating frequency to be optimized in a shorter time than that of the related art according to the fluctuation in the positional relationship between the power transmitting and receiving coils of the composite resonance circuit.

In addition, DC-to-DC converter 23 of the power receiving apparatus 200 for maximizing the transmission efficiency can be eliminated by configuring the non-contact power supply system using the drive control apparatus 50 for the composite resonance circuit. Furthermore, in order to maximize the transmission efficiency on the power transmission apparatus 100, it is unnecessary to perform impedance matching by DC-to-DC converter 23 in the power receiving apparatus 200.

The invention claimed is:

1. A drive control apparatus for a composite resonance circuit, the drive control apparatus configured to drive and control the composite resonance circuit including a plurality of LC resonant circuits including inductances L of power transmitting and receiving coils electromagnetically coupled to each other, the drive control apparatus comprising:

an inverter circuit configured to drive the composite resonance circuit by converting input DC power into AC power by switching the DC power at a predetermined operating frequency;

an input current detector configured to detect an input current of the inverter circuit; and a frequency controller and driver, wherein the composite resonance circuit comprises:

a power transmission LC resonance circuit configured to transmit the AC power from the inverter circuit; and a power receiving LC resonance circuit electromagnetically coupled to the inductance L of the power transmission LC resonance circuit, and configured to receive the AC power from the power transmission LC resonance circuit, wherein the composite resonance circuit has a resonance frequency at which a phase difference between a current flowing through the power transmission LC resonance circuit and a voltage applied to the power transmission LC resonance circuit is 0 and a power factor is 1 within an operating frequency range of the inverter circuit, wherein the frequency controller and driver configured to:

generate a drive signal of the inverter circuit while changing the predetermined operating frequency by using a predetermined extreme value search method to drive the inverter circuit, search for a resonant frequency of combined resonance characteristics of the composite resonance circuit based on whether the detected input current includes a negative current the resonant frequency being a frequency at which the detected input current does not include the negative current and an input power factor of the inverter circuit, and set the predetermined operating frequency as the searched resonance frequency, and wherein the frequency controller and driver causes the inverter circuit to perform a zero-volt switching (ZVS) operation by moving the predetermined operating frequency from the searched resonance frequency to a low frequency side or a high frequency side by a predetermined frequency based on resonance characteristics of the composite resonance circuit.

2. The drive control apparatus for the composite resonance circuit as claimed in claim 1, wherein the predetermined extreme value search method is a sweep method or a hill climbing method.

3. A non-contact power supply system comprising a drive control apparatus for a composite resonance circuit, wherein the drive control apparatus is configured to drive and control the composite resonance circuit including a plurality of LC resonant circuits including inductances L of power transmitting and receiving coils electromagnetically coupled to each other, the drive control apparatus comprising:

an inverter circuit configured to drive the composite resonance circuit by converting input DC power into AC power by switching the DC power at a predetermined operating frequency;

an input current detector configured to detect an input current of the inverter circuit; and a frequency controller and driver, wherein the composite resonance circuit comprises:

a power transmission LC resonance circuit configured to transmit the AC power from the inverter circuit; and a power receiving LC resonance circuit electromagnetically coupled to the inductance L of the power transmission LC resonance circuit, and configured to receive the AC power from the power transmission LC resonance circuit, wherein the composite resonance circuit has a resonance frequency at which a phase difference between a current flowing through the power transmission LC resonance circuit and a voltage applied to the power transmission LC resonance circuit is 0 and a power factor is 1 within an operating frequency range of the inverter circuit, wherein the frequency controller and driver configured to:

generate a drive signal of the inverter circuit while changing the predetermined operating frequency by using a predetermined extreme value search method to drive the inverter circuit, search for a resonant frequency of combined resonance characteristics of the composite resonance circuit based on whether the detected input current includes a negative current the resonant frequency being a frequency at which the detected input current does not include the negative current and an input power factor of the inverter circuit is 1, and set the predetermined operating frequency as the searched resonance frequency, wherein the non-contact power supply system comprises a power transmission apparatus and a power receiving apparatus, wherein the power transmission apparatus comprises:
the power transmission LC resonance circuit;
the input current detector;
the inverter circuit; and
the frequency controller and driver, and wherein the power receiving apparatus comprises the power receiving LC resonance circuit, and wherein the frequency controller and driver causes the inverter circuit to perform a zero-volt switching (ZVS) operation by moving the predetermined operating frequency from the searched resonance frequency to a low frequency side or a high frequency side by a predetermined frequency based on resonance characteristics of the composite resonance circuit.

4. The non-contact power supply system as claimed in claim 3,
wherein the power transmission apparatus further comprises a power factor correction circuit provided at a preceding stage of the input current detector, and configured to correct the power factor by shaping a waveform of the input current based on a predetermined AC voltage.

5. The non-contact power supply system as claimed in claim 3,
wherein the power transmission apparatus further comprises:
a first rectifying circuit provided at a preceding stage of the input current detector, and configured to rectify input AC power to a predetermined DC voltage; and
a first DC-to-DC converter configured to convert the predetermined DC voltage from the first rectifying circuit into a second predetermined DC voltage.

6. The non-contact power supply system as claimed in claim 3,
wherein the power receiving apparatus further comprises a second rectifying circuit configured to convert the AC power from the power receiving LC resonance circuit into a second DC power.

7. The non-contact power supply system as claimed in claim 6,
wherein the power receiving apparatus further comprises a second DC-to-DC converter configured to convert a DC voltage from the second rectifying circuit into a predetermined DC voltage.

* * * * *